United States Patent
Gross et al.

(10) Patent No.: US 12,049,550 B1
(45) Date of Patent: Jul. 30, 2024

(54) DURABLE, BROADBAND-TRANSPARENT POLYOXALAMIDE- BASED OPTICS AND METHODS OF MAKING AND USING THE SAME

(71) Applicant: HRL Laboratories, LLC, Malibu, CA (US)

(72) Inventors: Adam Gross, Santa Monica, CA (US); Andrew Nowak, Los Angeles, CA (US); Ashley Dustin, Los Angeles, CA (US); Kevin Drummey, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 419 days.

(21) Appl. No.: 17/548,236

(22) Filed: Dec. 10, 2021

Related U.S. Application Data

(63) Continuation-in-part of application No. 17/187,826, filed on Feb. 28, 2021.
(Continued)

(51) Int. Cl.
*B32B 3/00* (2006.01)
*B32B 27/08* (2006.01)
(Continued)

(52) U.S. Cl.
CPC ............... *C08K 3/11* (2018.01); *B32B 27/08* (2013.01); *C08G 73/00* (2013.01); *C08K 3/30* (2013.01);
(Continued)

(58) Field of Classification Search
CPC ............... B32B 27/08; B32B 2307/42; B32B 2307/412; B32B 2255/26; C08G 69/26; C08G 69/265; C08L 77/06
See application file for complete search history.

(56) References Cited

U.S. PATENT DOCUMENTS

| | | |
|---|---|---|
| 4,988,791 A | 1/1991 | Maruyama et al. |
| 5,464,932 A | 11/1995 | Allcock et al. |
| (Continued) | | |

FOREIGN PATENT DOCUMENTS

| | | |
|---|---|---|
| EP | 2883919 B1 | 6/2015 |
| EP | 2764320 B1 | 2/2018 |

OTHER PUBLICATIONS

CN 107667010 (Year: 2018).*
(Continued)

*Primary Examiner* — Elizabeth E Mulvaney
(74) *Attorney, Agent, or Firm* — O'Connor & Company; Ryan P. O'Connor

(57) ABSTRACT

Some variations provide an optic (such as an optical lens or an optical window) comprising at least 1 wt % of a polyoxalamide, wherein the optic is characterized by at least 40% average transmission of infrared radiation, and wherein the polyoxalamide comprises: first segments containing at least one repeat unit that includes (i) a branched, aliphatic hydrocarbon species and (ii) first amide groups at internal ends of the repeat unit, wherein the first amide groups are part of oxalamide groups; polymer end groups containing second amide groups that are each covalently bonded directly to one of the first amide groups, wherein the second amide groups are also part of the oxalamide groups, and wherein the oxalamide groups contain —N—C(=O)—C(=O)—N— sequences; and a reacted form of multifunctional amine chain extenders or crosslinkers with an amine functionality of 3 or greater. Methods of making and using the optic are described.

26 Claims, 24 Drawing Sheets
(22 of 24 Drawing Sheet(s) Filed in Color)

Related U.S. Application Data

(60) Provisional application No. 63/149,400, filed on Feb. 15, 2021.

(51) Int. Cl.
*C08G 73/00* (2006.01)
*C08K 3/11* (2018.01)
*C08K 3/30* (2006.01)
*G02B 1/04* (2006.01)
*G02B 1/18* (2015.01)

(52) U.S. Cl.
CPC ............... *G02B 1/041* (2013.01); *G02B 1/18* (2015.01); *C08K 2003/3036* (2013.01)

(56) References Cited

U.S. PATENT DOCUMENTS

| | | |
|---|---|---|
| 5,546,493 A | 8/1996 | Noguchi et al. |
| 5,633,077 A | 5/1997 | Olinger |
| 5,747,604 A | 5/1998 | Allcock et al. |
| 7,258,923 B2 | 8/2007 | van den Bogerd |
| 7,915,441 B2 | 3/2011 | Fushimi |
| 8,093,559 B1 | 1/2012 | Rajavel |
| 2015/0218372 A1 | 8/2015 | Henderson et al. |
| 2017/0022385 A1 | 1/2017 | Nowak et al. |
| 2018/0355230 A1* | 12/2018 | Rasmussen ............... C09J 11/06 |

OTHER PUBLICATIONS

We et al., "A rapid and efficient strategy for preparation of super-hydrophobic surface with cross-linked cyclotriphosphazene/6F-bisphenol A copolymer microspheres", Chem. Commun., 2010, 46, 487-489.

Tsilingiris, "Comparative evaluation of the infrared transmission of polymer films", Energy Conversion and Management 44 (2003) 2839-2856.

Allcock, "The Synthesis of Functional Polyphosphazenes and their Surfaces", Appl. Organom et al. Chem. 12, 659-666 (1998).

Mutua et al., "Synthesis and Properties of Bio-Based Poly(pentamethylene oxamide)", Polymer Engineering and Science 2018 58, 659-664.

Dong et al., "Preparation and Properties of Poly(hexamethylene oxamide) Copolymers Containing Ether Moiety", Polymer Engineering and Science, 2018 58, 1523-1529.

* cited by examiner

DURABLE, BROADBAND-TRANSPARENT POLYOXALAMIDE- BASED OPTICS AND METHODS OF MAKING AND USING THE SAME

PRIORITY DATA

This patent application is a non-provisional application claiming priority to U.S. Provisional Patent App. No. 63/149,400, filed on Feb. 15, 2021, which is hereby incorporated by reference herein. This patent application is also a continuation-in-part of U.S. patent application Ser. No. 17/187,826, filed on Feb. 28, 2021, which is hereby incorporated by reference herein.

FIELD OF THE INVENTION

The present invention generally relates to polyoxalamide broadband-transparent optics, and methods of making and using polyoxalamide broadband-transparent optics.

BACKGROUND OF THE INVENTION

Broadband-transparent materials are materials that are transparent over a broad electromagnetic band including at least two of ultraviolet (UV), visible (Vis), and infrared (IR). Broadband-transparent materials may be used in a variety of applications, such as coatings, windows, and lenses.

Combining visual transparency and IR transparency in a single material is challenging due to requirements such as a high degree of homogeneity, a low variation in index of refraction throughout the material, and the requirement for bonds that do not absorb in the visual spectrum and the IR spectrum. Many IR-transparent materials are classified as semiconductors and possess band gaps in excess of the energies of IR light. However, most of these band gaps are not sufficiently large to pass visible light, thus rendering the IR-transparent materials visually opaque. The few materials that are transparent across both visible and IR spectrums are difficult or impossible to fashion into lenses or windows. Additionally, these materials suffer the drawback of typically being rigid and prone to breakage. Materials with good UV transmission (such as quartz) or good IR transmission (such as inorganic semiconductors) tend to be hard, brittle materials that are difficult and expensive to process and shape. IR-transparent windows and lenses have significant commercial value but their cost and fragility have been a drawback.

Industrial materials are often exposed to the environment and intense UV radiation. Durability to extended exposure in these environments is critical. However, common UV stabilizers are typically highly absorptive in the IR band, thus rendering their addition unacceptable when an IR-transparent material is desired. When the IR-transparent material is also UV-transparent, UV absorption and consequent degradation is reduced or avoided.

There are potential advantages to broadband-transparent materials in the form of broadband-transparent polymers. In particular, polymers have the potential to provide good toughness, durability, and cost. However, transparent polymeric materials tend to be limited in the wavelength ranges they can pass. For example, polycarbonate and poly(methyl methacrylate) are visually transparent but infrared-opaque. Polyethylene is infrared-transparent but visually opaque. Broadband transparency, particularly in the UV and mid-wave to long-wave IR spectrum, is an uncommon feature of polymeric materials. Polymer crystallinity and inhomogeneity at the micrometer scale scatters light, thereby limiting visual transmission and image quality across the Vis-IR spectrum. In addition, polymer softness produces poor abrasion resistance and limits durability in aggressive environments.

A combination of the toughness and durability of typical engineering plastics (such as polycarbonate) with broadband transmission properties is a longstanding trade in the materials space and is a serious problem in the areas of IR detectors and lenses, for example. An improvement upon the heretofore known structures would be the formation of a curable network over convenient times and temperatures, creating a crosslinked structure that is transparent across a wide wavelength range and is robust against environmental exposure.

Some specific applications of broadband-transparent polymers are durable, transparent protective coatings for automotive integrated light detection and ranging (LIDAR); optics for UV sources; quartz window alternatives for intense UV sanitation; and low-cost, increased-durability materials (windows and lenses) for IR vision systems. Additional commercial opportunities exist in the area of 3D printing, see-through inspection panels, low-emissivity coatings, and compound lens stacks, for example. Other applications relate to dual-band imaging, such as visible-LWIR imaging or near infrared (NIR)-LWIR imaging.

Transparency specifically within the infrared band is important for many applications. Infrared radiation is emitted or absorbed by molecules when they change their rotational and vibrational movements, and as a result of thermal heating. Infrared radiation is used in industrial, scientific, military, law enforcement, and medical applications. Applications include target acquisition, surveillance, night vision, homing, tracking, thermal efficiency analysis, environmental monitoring, industrial facility inspections, remote temperature sensing, short-range wireless communication, and weather forecasting. Night-vision devices using active near-infrared illumination allow people or animals to be observed without the observer being detected or with additional illumination at night. Infrared astronomy uses sensor-equipped telescopes to penetrate dusty regions of space such as molecular clouds, detect objects such as planets, and view highly red-shifted objects from the early days of the universe. Infrared thermal-imaging cameras are used to detect heat loss in insulated systems, observe changing blood flow in the skin, and detect overheating of electrical apparatus. Materials with infrared transparency play a critical role in enabling new optical devices and systems for thermal-imaging applications, such as heat sensing and night-vision optics.

The medium-wavelength infrared (MWIR) and the long-wavelength infrared (LWIR) bands find applications in infrared thermography for military or civil applications, e.g. target signature identification, surveillance, and non-destructive evaluation. The MWIR band may be preferred when inspecting high-temperature objects, and the LWIR band may be preferred when working with near-room-temperature objects. Other criteria for band selection include the operating distance, indoor versus outdoor operation, object temperature, background temperature, and emissivity of the bodies of interest.

Modern infrared cameras operate over multiple bands in both the MWIR and LWIR spectrums. In order to function successfully, the camera's detector surface is usually enclosed behind an IR-transparent window or domed enclosure. When used in service on an automotive or aerospace vehicle, the enclosure must not only be IR-transparent but also able to withstand considerable environmental exposure in the form of temperature extremes along with high-speed erosion causes including wind, rain, ice, dust, sand, and dirt. Such conditions will rapidly degrade soft, non-durable transmission windows through erosion and surface etching (such as abrasion by sand particles).

Other applications utilizing LWIR optics require environmental durability and mechanical strength, in addition to infrared optical transparency. That is, the materials must simultaneously serve as optical and structural materials. The dual requirements make this a particularly difficult materials problem. There is a need in the art to reduce the cost and increase the durability of materials that function in the MWIR and LWIR bands. Tough, low-cost IR windows and lenses are particularly sought.

Inorganic semiconductors and metal oxides are known IR-transparent materials but suffer from various deficiencies, such as being prone to environmental damage during use. While highly transparent across various bands of the IR spectrum, inorganic semiconductors are brittle and lack durability required of many applications such as placement on the exterior of a high-speed vehicle or when exposed to extended periods of sand, rain, and wind in the environment. Environmental damage can be caused by cracking or scratching, for example. Additionally, the band gaps of inorganic semiconductors typically cause them to be opaque in the visible spectrum.

Aluminum oxynitride (AlON) is a ceramic material that is IR-transparent at wavelengths from 0.25 μm to 4.5 μm. It has a density of 3.7 g/cm$^3$ and an index of refraction of 1.8. AlON is damage-resistant as well as thermally stable to temperatures of 1900° C. However, AlON is very expensive and does not detect the entire MWIR band.

Sapphire is IR-transparent at wavelengths from 0.15 μm to 5 μm. It has a density of 4 g/cm$^3$ and an index of refraction of 3.9. Sapphire is damage-resistant as well as thermally stable to temperatures of 1800° C. However, sapphire is a precious gemstone and is very expensive.

Germanium (Ge) is IR-transparent at wavelengths from 3 μm to 12 μm. It has a density of 2.3 g/cm$^3$ and an index of refraction of 1.7. Germanium is not damage-resistant, is not thermally stable above 200° C. and starts to lose IR transparency above 100° C., and does not scale-up well. Germanium is a very expensive material.

Zinc sulfide (ZnS) and zinc selenide (ZnSe) are IR-transparent at wavelengths from 3 μm to 12 μm. ZnS has a density of 4.1 g/cm$^3$ and an index of refraction of 2.2, while ZnSe has a density of 5.3 g/cm$^3$ and an index of refraction of 2.4. These materials are only somewhat damage-resistant, and they do not scale-up well. Both ZnS and ZnSe are extremely expensive and are not stable above 200° C.

Advanced chalcogenide alloys (e.g., $Ge_{28}Sb_{12}Se_{60}$ or $As_{40}Se_{60}$) also suffer from low work of fracture and do not scale-up well. Chalcogenide glasses require extreme processing requirements for melt fabrication of optical elements. Chalcogenide glasses are also very brittle.

Inorganic salts are another option with excellent visual and IR broadband transparency, but water solubility and brittleness limit their utility outside of very benign environments.

Inorganic-organic materials such as sulfur-based glasses made by inverse vulcanization have shown some promise in MWIR transparency, but not broadband transparency. Sulfur-based materials are susceptible to numerous complications from high-temperature processing, narrow processing parameters, and poor mechanical properties. Also, these materials are usually visibly opaque.

In the area of polymeric materials, many visually transparent and environmentally tough materials can be found, but the tendency of polymers is to be opaque across the IR spectrum due to vibrational absorption frequencies of common organic bonds.

Polyethylene is a polymer that is IR-transparent at wavelengths from 4 μm to 6.5 μm and from 7.5 μm to 12 μm. Polyethylene has a density of about 1 g/cm$^3$ and an index of refraction of 1.53. Although polyethylene is a low-cost material, it is soft and not damage-resistant which limits its applications for IR-transparent materials. Polyethylene cannot normally be crosslinked to make it a hard (thermoset) polymer. The polymer is thus soft and easily scratched, resulting in a material that will scatter light when damaged. Also, polyethylene crystallinity creates scattering and prevents visual transparency.

Polytetrafluoroethylene (PTFE) is a polymer that is IR-transparent at wavelengths from about 3 μm to 7.5 μm and from about 9 μm to about 15 μm. PTFE has a density of about 2.2 g/cm$^3$ and an index of refraction of about 1.4. Although PTFE is a relatively low-cost material, it is not damage-resistant which limits its applications for IR-transparent materials. PTFE cannot normally be crosslinked to make it a hard (thermoset) polymer. The soft polymer will scatter light when damaged.

Many common polymers such as polyesters, polyethers, and polysiloxanes exhibit characteristic LWIR absorptions due to single bonds to oxygen such as C—O or Si—O bonds. Other aromatic polymers, such as polystyrene, exhibit LWIR absorptions due to aromatic C—H bonds. These absorptions essentially disqualify any aromatic material containing C—O or Si—O single bonds, when LWIR transparency is needed.

Olefin polymers are often capable of LWIR transmission. While polyethylene and polypropylene can be LWIR-transparent, polyethylene suffers from visual opacity as noted above. In addition, both polyethylene and polypropylene suffer from chemical inertness that makes it difficult to (a) functionalize the polymers with desirable functional groups, (b) bond to surfaces, or (c) crosslink the polymers. Cyclic olefin copolymers typically have narrow IR transparency bands.

The limitations of the conventional art may be summarized as follows. Many current IR-transparent materials are inorganic semiconductors. While highly transparent across various bands of the IR spectrum, inorganic semiconductors are brittle, are time-consuming to fabricate with diamond turning and polishing, and lack the durability required in many exterior applications. Additionally, the band gaps of these materials may block visible light. Inorganic salts are another option with excellent visual and IR broadband transparency, but they are water-soluble and brittle, which limits their utility outside of very benign environments. Many visually transparent and environmentally tough polymeric materials can be found, but they are generally IR-opaque due to the absorption frequencies of common organic bonds. Polyethylene is the strongest performer from an IR transparency perspective, but the natural crystallinity creates scattering and prevents visual transparency. In addition, the soft, thermoplastic constraints of polyethylene limit durability and upper operating temperatures.

Unequivocally, it has proven heretofore challenging to produce tough, broadband-transparent optics. There is a desire for a broadband-transparent optic material for many applications, such as (but by no means limited to) broadband cameras functional in both visual and IR frequencies along with the durability to operate in harsh, real-world environments while protecting the underlying imaging equipment.

SUMMARY OF THE INVENTION

The present invention addresses the aforementioned needs in the art, as will now be summarized and then further described in detail below.

Some variations provide an optic comprising at least 1 wt % of a polyoxalamide polymer, wherein the optic is in the form of an optical lens or an optical window, wherein the optic is preferably characterized by at least 40% average transmission of radiation over a wavenumber band with cumulative wavenumber width of at least 1000 cm' contained within wavelengths (i) from 0.3 µm to 1.7 µm and (ii) from 3 µm to 5 µm and/or from 8 µm to 12 µm, and wherein the polyoxalamide polymer comprises:
  (a) one or more first segments containing at least one repeat unit that includes (i) a branched, aliphatic hydrocarbon species and (ii) first amide groups at internal ends of the repeat unit, wherein the first amide groups are part of oxalamide groups;
  (b) one or more polymer end groups containing second amide groups that are each covalently bonded directly to one of the first amide groups, wherein the second amide groups are also part of the oxalamide groups, and wherein the oxalamide groups contain —N—C(=O)—C(=O)—N— sequences; and
  (c) a reacted form of one or more multifunctional amine chain extenders or crosslinkers with an amine functionality of 3 or greater.

In some embodiments, the optical lens is a single lens, a compound lens, or an array of lenses. The optical lens may be selected from the group consisting of a converging lens, a diverging lens, a collimating lens, and combinations thereof. An optical lens may be convex, concave, biconvex, biconcave, etc.

In some embodiments, the optical window is a single window, a compound window, or an array of windows. The optical window may be flat, curved on one axis, biaxially curved, curved in three dimensions, or a combination thereof.

In some embodiments, the optic is characterized by at least 40% average transmission of radiation over a wavenumber band with cumulative wavenumber width of at least 1500 cm' or at least 2000 $cm^{-1}$ contained within wavelengths (i) from 0.3 µm to 1.7 µm and (ii) from 3 µm to 5 µm and/or from 8 µm to 12 µm.

In typical embodiments, the optic further contains filler particles. Filler particles may be selected from the group consisting of toughening particles (e.g., polypropylene, polyethylene, or an ethylene-propylene copolymer), transparency-modifying particles, refractive index-modifying particles (e.g., high-refractive-index nanoparticles), and combinations thereof. In some embodiments, the filler particles are selected from the group consisting of Ge, $CaF_2$, NaCl, KCl, KBr, diamond, Si, CsI, MgO, $MgF_2$, LiF, NaF, $BaF_2$, ZnS, ZnSe, PbS, PbSe, $PbF_2$, $LiYF_4$, $NaYF_4$, ThBrI, ThBrCl, Si, SiC, Ge, GaAs, AlN, AlON, $Al_2O_3$, polyethylene, polypropylene, and combinations thereof. Multiple types of filler particles may be present. Other additives may be present in the optic, such as sulfur, mineral oil, and/or inorganic pigments, for example.

In certain embodiments, the filler particles are high-refractive-index nanoparticles that have a higher index of refraction compared to the polyoxalamide polymer, and wherein the high-refractive-index nanoparticles are selected from the group consisting of titanium dioxide, silicon, germanium, zinc oxide, silicon carbide, silicon dioxide, hafnium oxide, zinc selenide, zinc sulfide, sapphire, cesium fluoride, cesium bromide, potassium bromide, potassium iodide, and combinations thereof. In specific embodiments, high-refractive-index nanoparticles are incorporated to provide a gradient index of refraction lens.

The filler particles may be in the form of spheres, rods, whiskers, platelets, or a combination thereof, for example. The filler particles may have an average dimension selected from about 2 nanometers to about 1 micron, for example. The filler particles may have an average volumetric loading from about 1 vol % to about 65 vol % based on volume of the polyoxalamide polymer plus volume of the filler particles, for example. In some embodiments, the filler particles contain a ligand to aid in dispersion with the polyoxalamide polymer.

In some embodiments, the optic further includes, or is disposed in physical contact with, an anti-scratch layer, an anti-abrasion layer, an anti-reflection layer, or a combination thereof.

An anti-scratch layer may contain diamond, diamond-like carbon, sapphire, silicon, ZnS, SiC, AlON, or a combination thereof, for example. In some embodiments, the optic includes a stack of films that collectively provides anti-reflection properties.

In some embodiments, the optic further includes an anti-rain erosion layer. The anti-rain erosion layer may contain an elastomeric material, such as an elastomeric material with a storage modulus from about 1 MPa to about 500 MPa, and a minimum elongation of 100%. The elastomeric material may be or contain a thermoplastic or thermoset polymer. In some embodiments, a polyoxalamide polymer is used as or in the elastomeric material.

In some embodiments, the optic further includes an anti-fouling layer on an exterior surface of the optic. The anti-fouling layer may contain a hydrophobic material (e.g., a fluoropolymer), for example.

In some embodiments, the optic comprises at least 2 wt %, at least 5 wt %, at least 10 wt %, or at least 20 wt % of the polyoxalamide polymer.

In some embodiments, the polyoxalamide polymer is contained in a protective layer coating or surrounds an inorganic substrate. The inorganic substrate may be selected from the group consisting of silica, quartz, sapphire, $Al_2O_3$, AlON, ZnS, ZnSe, Si, Ge, SiC, GaAs, $CaF_2$, and combinations thereof, for example.

The branched, aliphatic hydrocarbon species may have a degree of branching β of at least 0.05, for example. The branched, aliphatic hydrocarbon species may have a number-average molecular weight ($M_n$) from about 50 g/mol to about 5,000 g/mol, for example.

The branched, aliphatic hydrocarbon species may be derived from a branched monomer selected from the group consisting of (12E,15E)-N-[(21E,24E)-hexatriaconta-21,24-dienyl]hexatriaconta-12,15-dien-1-amine, 2,2,4-trimethyl hexamethylene diamine, 2,4,4-trimethyl hexamethylene diamine, 2-methyl-L5-pentanediamine, isophorone diamine, chemical analogues thereof, oligomers thereof, and combinations of the foregoing. Exemplary branched monomers include Priamine 1071, Priamine 1073, Priamine 1074, and Priamine 1075.

In some embodiments, the N—C(=O)—C(=O)—N— sequences are reaction products derived from starting oxalate species comprising dialkyl oxalates. The dialkyl oxalates may be selected from the group consisting of dimethyl oxalate, diethyl oxalate, dibutyl oxalate, di-tert-butyl oxalate, chemical analogues thereof, and combinations of the foregoing.

In some embodiments, the multifunctional amine chain extenders or crosslinkers are selected from the group consisting of 4-(aminomethyl)octane-1,8-diamine, 3-(aminomethyl)octane-1,8-diamine, 2-(aminomethyl)octane-1,8-diamine, 1-(aminomethyl)octane-1,8-diamine, tetraethylenetriamine, tetraethylenetetramine, tetraethylenepentamine, N-(hydroxyethyl)diethylenetriamine, chemical analogues thereof, and combinations of the foregoing.

In some embodiments, the polyoxalamide polymer has a degree of polymer crosslinking $\chi$ of at least 0.2. In various embodiments, $\chi$ is about, at least about, or at most about 0, 0.05, 0.1, 0.15, 0.2, 0.25, 0.3, 0.4, 0.5, 0.6, 0.7, 0.8, or 0.9, including all intervening ranges.

In some embodiments, the polyoxalamide polymer does not contain sulfur crosslinks. In some embodiments, the polyoxalamide polymer does not contain ether bonds, ester bonds, or either ether bonds or ester bonds.

Some variations of the invention provide a method of making an optic, the method comprising:
(a) providing a first reactant comprising a branched, aliphatic hydrocarbon species that is amine-terminated;
(b) providing a second reactant comprising an oxalate species;
(c) reacting the first reactant with the second reactant, under effective prepolymerization conditions and optionally in the presence of a prepolymerization solvent, to generate a polyoxalamide prepolymer;
(d) reacting the polyoxalamide prepolymer with a multifunctional amine chain extender or crosslinker having an amine functionality of 3 or greater, under effective polymerization conditions and optionally in the presence of a polymerization solvent, to generate a polyoxalamide polymer; and
(e) forming an optic comprising at least 5 wt % of the polyoxalamide polymer, wherein the optic is formed as an optical lens or an optical window.

In some methods, the first reactant is selected from the group consisting of (12E,15E)-N-[(21E,24E)-hexatriaconta-21,24-dienyl]hexatriaconta-12,15 dien-1-amine, 2,2,4-trimethyl hexamethylene diamine, 2,4,4-trimethyl hexamethylene diamine, 2-methyl-1,5-pentanediamine, isophorone diamine, chemical analogues thereof, oligomers thereof, and combinations of the foregoing.

In some methods, the oxalate species are selected from dialkyl oxalates. For example, the dialkyl oxalates may be selected from the group consisting of dimethyl oxalate, diethyl oxalate, dibutyl oxalate, di-tert-butyl oxalate, chemical analogues thereof, and combinations of the foregoing.

In some methods, the multifunctional amine chain extender or crosslinker is selected from the group consisting of 4-(aminomethyl)octane-1,8-diamine, 3-(aminomethyl)octane-1,8-diamine, 2-(aminomethyl)octane-1,8-diamine, 1-(aminomethyl)octane-1,8-diamine, tetraethylenetriamine, tetraethylenetetramine, tetraethylenepentamine, N-(hydroxyethyl)diethylenetriamine, chemical analogues thereof, and combinations of the foregoing.

In some methods, the polyoxalamide prepolymer comprises: one or more first segments containing at least one repeat unit that includes (i) a branched, aliphatic hydrocarbon species and (ii) amide groups at internal ends of the repeat unit; and one or more prepolymer end groups containing ester groups that are each covalently bonded directly to one of the amide groups to form —N—C(=O)—C(=O)—O— sequences.

In some methods, step (e) comprises casting the polyoxalamide polymer, pressing the polyoxalamide polymer into a mold, filming the polyoxalamide polymer, or a combination thereof.

The method may further comprise adding filler particles in a first solvent to the polyoxalamide prepolymer in a second solvent, thereby creating a mixture; optionally removing the first solvent and/or the second solvent from the mixture; casting or spraying a film of the mixture; and curing the film to form the optic. Solvent removal may be accomplished by heating, evaporation, vacuum, or a combination thereof, for example. The first solvent and the second solvent may be chemically different, or they may be the same. The prepolymer is preferably soluble in both the first solvent and the second solvent.

The method may further comprise adding filler particles to the first reactant, to the second reactant, or to both first reactant and second reactant.

In some methods, filler particles are combined with the polyoxalamide polymer, thereby creating a mixture. The mixture may then be cast or pressed into a mold to fabricate the optic. The filler particles may be selected from the group consisting of toughening particles, transparency-modifying particles, refractive index-modifying particles, and combinations thereof. The filler particles may contain a ligand or a surface coating to aid in solubility with the first solvent. Filler particles are preferably soluble in both the first solvent and the second solvent.

Other variations provide a method of coating an optic, the method comprising:
(a) providing a first reactant comprising a branched, aliphatic hydrocarbon species that is amine-terminated;
(b) providing a second reactant comprising an oxalate species;
(c) reacting the first reactant with the second reactant, under effective prepolymerization conditions and optionally in the presence of a prepolymerization solvent, to generate a polyoxalamide prepolymer;
(d) reacting the polyoxalamide prepolymer with a multifunctional amine chain extender or crosslinker having an amine functionality of 3 or greater, under effective polymerization conditions and optionally in the presence of a polymerization solvent, to generate a polyoxalamide polymer; and
(e) forming an optic coating comprising at least 1 wt % of the polyoxalamide polymer, wherein the optic coating is disposed on an optical lens or an optical window.

The first reactant may be selected from the group consisting of (12E,15E)-N-[(21E,24E)-hexatriaconta-21,24-dienyl]hexatriaconta-12,15 dien-1-amine, 2,2,4-trimethyl hexamethylene diamine, 2,4,4-trimethyl hexamethylene diamine, 2-methyl-L5-pentanediamine, isophorone diamine, chemical analogues thereof, oligomers thereof, and combinations of the foregoing.

The oxalate species may be selected from dialkyl oxalates, such as (but not limited to) dimethyl oxalate, diethyl oxalate, dibutyl oxalate, di-tert-butyl oxalate, chemical analogues thereof, or combinations of the foregoing.

The multifunctional amine chain extender or crosslinker may be selected from the group consisting of 4-(aminomethyl)octane-1,8-diamine, 3-(aminomethyl)octane-1,8-diamine, 2-(aminomethyl)octane-1,8-diamine, 1-(aminomethyl)octane-1,8-diamine, tetraethylenetriamine, tetraethylenetetramine, tetraethylenepentamine, N-(hydroxyethyl)diethylenetriamine, chemical analogues thereof, and combinations of the foregoing.

The polyoxalamide prepolymer may comprise: one or more first segments containing at least one repeat unit that includes (i) a branched, aliphatic hydrocarbon species and (ii) amide groups at internal ends of the repeat unit; and one or more prepolymer end groups containing ester groups that are each covalently bonded directly to one of the amide groups to form —N—C(=O)—C(=O)—O— sequences.

Step (e) may comprise filming the polyoxalamide polymer to form the optic coating, for example.

In some methods, the method further comprises adding filler particles in a first solvent to the polyoxalamide prepolymer in a second solvent, thereby creating a mixture; optionally removing the first solvent and/or the second solvent from the mixture; spraying, spinning, or dip-coating a film of the mixture onto the optical lens or optical window; and curing the film to form the optic coating. The first solvent and the second solvent may be chemically different, or they may be the same. The prepolymer is preferably soluble in both the first solvent and the second solvent. Solvent removal may be accomplished by heating, evaporation, vacuum, or a combination thereof, for example.

The method may further comprise adding filler particles to the first reactant, to the second reactant, or to both first reactant and second reactant.

Optionally, an adhesion layer may be introduced between the optic coating and the optical lens or optical window.

In methods of forming an optic coating, the filler particles may be selected from the group consisting of toughening particles, transparency-modifying particles, refractive index-modifying particles, and combinations thereof, for example. The filler particles may contain a ligand or a surface coating to aid in solubility with the first solvent. Filler particles are preferably soluble in both the first and second solvent.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION OF EMBODIMENTS OF THE INVENTION

Figure 1:
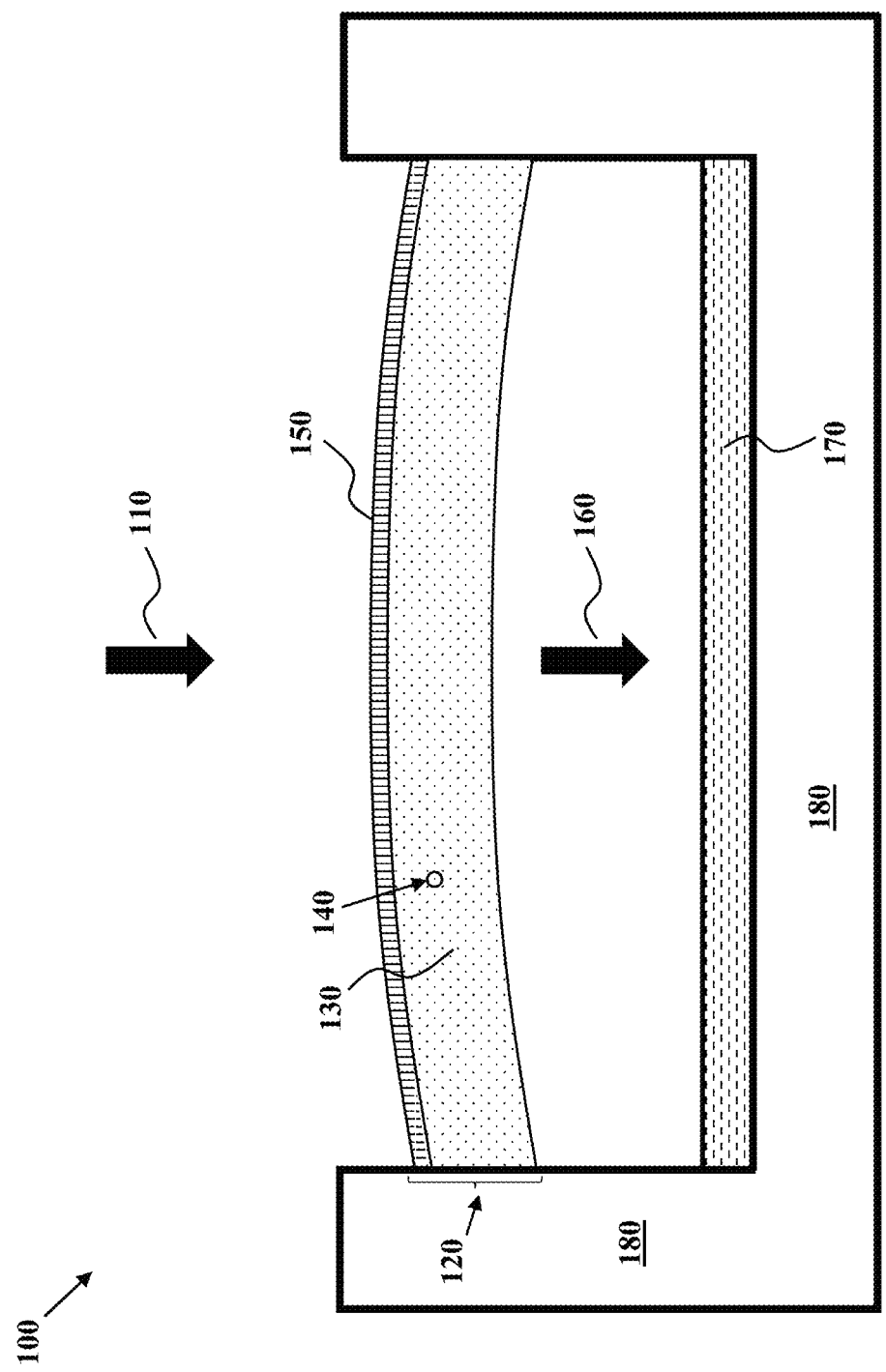
FIG. 1 depicts an exemplary optic, in some embodiments of the present invention.

The principles, structures, compositions, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms, except when used in Markush groups. Thus in some embodiments not otherwise explicitly recited, any instance of "comprising" may be replaced by "consisting of" or, alternatively, by "consisting essentially of."

Some variations of the invention provide lenses and windows made from visible-transparent and infrared (IR)-transparent polymers which control the propagation of light. Preferred polyoxalamide polymers, as described herein, are unique with an unprecedented combination of broadband transparency with mechanical durability. The optics described in this disclosure contain polyoxalamides and may further include inorganic and/or organic fillers or layers to obtain variable index of refraction, scratch resistance, abrasion resistance, and/or improved broadband transparency. The disclosed broadband-transparent optic enables broadband cameras sensitive in both visual and IR frequencies with the durability to operate in severe environments while protecting the underlying imaging equipment.

Some variations of the invention are predicated on the discovery of durable, transparent polymer films and utilization in optics. This disclosure describes durable polymeric films and windows capable of transmitting across a broad spectrum of light, such as within the ultraviolet (UV, 200-400 nm), visual (Vis, 400-800 nm), near infrared (NIR, 0.8-3 µm), medium-wave infrared (MWIR, 3-5 µm), and/or long-wave infrared (LWIR, 8-12 µm) wavelengths of light. Reference may also be made to light wavenumbers, which are the number of waves per unit distance. The wavenumber is the inverse of wavelength. For instance, a wavelength of 5 µm corresponds to a wavenumber of 2000 $cm^{-1}$. The wavenumber times the speed of light is the wave frequency.

In this disclosure, "broadband" refers to a plurality of wavelengths that encompass, or are within, at least of two of UV, Vis, NIR, MWIR, and LWIR. In some embodiments, a broadband wavelength refers to wavelengths that encompass, or are within, at least of three, at least four, or all five of UV, Vis, NIR, MWIR, and LWIR.

In this disclosure a "polymer" means a large molecule, or macromolecule, composed of at least two repeat subunits. The number of repeat subunits may be in principle any number greater than 2, but typically is limited to about 10,000. In various embodiments, the number of repeat subunits (also known as the degree of polymerization) is 2, 3, 4, 5, about 10, about 50, about 100, about 200, about 500, about 1,000, about 2,000, or about 5,000. The polymer may be linear, branched, cyclic, crosslinked, or a combination thereof. The polymer is typically a solid but can also be a liquid, depending on molecular weight, degree of crosslinking, and external conditions such as temperature. A "crosslink" is a bond that links one polymer chain to another. The crosslinking bonds may be covalent bonds, ionic bonds, or a combination thereof.

The present inventors believe that a combination of visible and IR transparency with mechanical durability is unprecedented for polymers and polymer-based optics. While organic, polymeric materials are frequently tough and durable, the polymers absorb broadly in the infrared (IR) spectrum due to absorption characteristic of organic bonds as well as scattering caused by crystallinity or inhomogeneity that limits visible transmission. However, the present inventors have now discovered polyoxalamide compositions and corresponding processing techniques as routes to durable, broadband-transparent (in particular, visible-transparent and IR-transparent) polymer films.

Polyoxalamides are a known class of materials and the IR transparency of the structural oxalamide unit is also known. See Dong et al., "Preparation and properties of poly(hexamethylene oxamide) copolymers containing ether moiety", *Polymer Engineering & Science* Volume 58, Issue 9 (2017), which is incorporated by reference. However, the ability to process polyoxalamide materials into transparent films across a broad range of frequencies has heretofore been frustrated by (1) monomers that are absorbing in the IR spectrum; (2) the tendency of the polymer to crystallize or otherwise be inhomogeneous, rendering it opaque; and (3) the rapid reaction rate of the materials, making it difficult to cast or spray monoliths or films.

Polyoxalamides show promising LWIR transparency with characteristic absorbance peaks just outside of the LWIR band. Polyoxalamides have not been highly investigated due to commercial abundance of polyurethane and polyurea-type resins with similar mechanical properties. However, urethane and urea motifs (in commercial resins) absorb more in the LWIR band than do oxalamides, typically because of the density of urethane and urea bonds and their combination with polyester or polyether LWIR-absorbing species.

Polyoxalamides with broadband transparency are not known in the art due to high crystallinity (visible opaqueness) in systems with low-molecular-weight aliphatic species and infrared absorption in systems with common soft segments (LWIR opaqueness). Low-molecular-weight, aliphatic polyoxalamide systems tend to become semi-crystalline and non-processable. In order to be processable, polyoxalamide resins conventionally incorporate polyester, polyether, polysiloxane, or other types of soft segments—which tend to absorb in the LWIR.

Alkyl-rich polyoxalamides break the aforementioned trades by providing a broadband-transparent material with durability and toughness that far exceeds current IR-transparent materials, thereby enabling use in environmentally demanding optics. For example, a broadband-transparent window material enables broadband cameras that are effective in both visual and IR frequencies. The polymer durability allows operation in harsh, real-world environments while protecting the underlying imaging equipment.

In particular, in some variations, oxalate precursors are combined with alkyl amine species to form IR-transparent networks arising from low crystallinity and relatively IR-transparent species, such as branched aliphatic monomers. Crystallization strongly scatters light and renders the material opaque across a variety of wavelengths. Judicious selection of monomers can suppress crystallization and support amorphous structures that maintain excellent visual transparency in the materials. The hydrogen-bonding character of oxalamide groups provides mechanical durability in the polymer, in the form of high tensile strength and elongation.

Polyoxalamides may generally be synthesized by the bulk reaction of amine reactive groups with dioxalate groups, forming an alcohol condensate. Amine reactive groups may be small-molecule diamines or oligomers endcapped with amines, for example. Small-molecule diamines generate crystallizable polyoxalamide systems due to proximity of hydrogen bonding from the oxalamide. Oxalamide hydrogen bonding is beneficial to mechanical properties, such as toughness, but the crystallinity is not desirable for broadband-transparent materials. Flexible oligomeric soft-segment amines decrease polymer crystallization and reduce the efficacy of hydrogen bonding from the oxalamide.

The present inventors have found an aliphatic, branched diamine with high carbon content that does not crystallize when polymerized with dioxalate groups. By exploiting the non-crystalline nature, the material forms reactive polyoxalamide prepolymers containing dioxalate end groups that can be thermosetted with amine curatives. The pot life of the polyoxalamide prepolymers and amine curative is typically limited, but the polyoxalamide prepolymers may be rapidly processed into thin films. Polyoxalamide prepolymers are miscible with various solvents and optionally olefinic fillers to aid in processing and extend pot life. Ultimately, the polyoxalamide prepolymers react with amine curatives to form amorphous, crosslinked, thermoset films with broadband transparency. Branched aliphatic polyoxalamides provide tough, broadband-transparent films unlike any other known materials.

Some variations provide an optic comprising at least 1 wt % of a polyoxalamide polymer, wherein the optic is in the form of an optical lens or an optical window, wherein the optic is preferably characterized by at least 40% average transmission of radiation over a wavenumber band with cumulative wavenumber width of at least 1000 $cm^{-1}$ contained within wavelengths (i) from 0.3 µm to 1.7 µm and (ii) from 3 µm to 5 µm and/or from 8 µm to 12 µm, and wherein the polyoxalamide polymer comprises:

(a) one or more first segments containing at least one repeat unit that includes (i) a branched, aliphatic hydrocarbon species and (ii) first amide groups at internal ends of the repeat unit, wherein the first amide groups are part of oxalamide groups;

(b) one or more polymer end groups containing second amide groups that are each covalently bonded directly to one of the first amide groups, wherein the second amide groups are also part of the oxalamide groups, and wherein the oxalamide groups contain —N—C(=O)—C(=O)—N— sequences; and (c) a reacted form of one or more multifunctional amine chain extenders or crosslinkers with an amine functionality of 3 or greater.

The "average transmission" is defined as the ratio (expressed as a percentage) of radiation intensity through an optic thickness of 25 microns divided by incident radiation intensity. Note that the average transmission is an average over a range of wavelengths and may be calculated, for example, as the average value of the transmission in 0.1 micron increments of wavelength, or another increment of wavelength within the selected range of wavelengths. Incident light is normal (perpendicular) to the surface.

Regular transmission of infrared light at a selected wavelength can be determined for a sample 25 microns (about 0.001 inch) thick, or for another thickness of interest, as $I(t)/I_0$, where $I_0$ is the incident intensity and $I(t)$ is the intensity as a function of thickness. $I(t)/I_0$ at a given panel thickness can be experimentally determined, for example, using a Perkin Elmer IR spectrometer. It is noted that one of ordinary skill in the art will understand that transmission generally can include regular transmission and diffuse transmission, both of which can contribute to total transmission. The average transmission values in this specification include only regular transmission.

The "cumulative wavenumber width" of a band is the total width, measured in wavenumbers, of one or more specified wavelengths. For example, the wavenumber width of a band starting at 1200 $cm^{-1}$ and ending at 1000 $cm^{-1}$ is (1200 $cm^{-1}$-1000 $cm^{-1}$)=200 $cm^{-1}$. The cumulative wavenumber width can include multiple, distinct wavelength bands. For example, in preferred embodiments, there is at least 1000 $cm^{-1}$ cumulative wavenumber width contained within wavelengths from 0.3 µm to 1.7 µm, from 3 µm to 5 µm, and/or from 8 µm to 12 µm. Part of the 1000 $cm^{-1}$ wavenumber width may be within the 0.3-1.7 µm wavelength band, part of the 1000 $cm^{-1}$ wavenumber width may be within the 3-5 µm wavelength band, and/or part of the 1000 $cm^{-1}$ wavenumber width may be within the 8-12 µm wavelength band. Or the 1000 $cm^{-1}$ wavenumber width may be fully contained in only the 0.3-1.7 µm wavelength band, or only the 3-5 µm wavelength band, or only the 8-12 µm wavelength band, or only the 0.3-1.7 µm and 3-5 µm wavelength bands, or only the 0.3-1.7 µm and 8-12 µm wavelength bands, or only the 3-5 µm and 8-12 µm wavelength bands. Within these bands, there may be wavelengths (sub-bands) for which there is at least 40% transmission of radiation and other wavelengths for which there is less than 40% transmission of radiation.

In some embodiments, the optic is characterized by at least 50%, at least 60%, at least 70%, at least 75%, at least 80%, at least 85%, at least 90%, or at least 95% average transmission of radiation over a wavenumber band with cumulative wavenumber width of at least 1000 $cm^{-1}$, at least 1500 $cm^{-1}$, or at least 2000 $cm^{-1}$, contained within wavelengths from 0.3 µm to 1.7 µm, from 3 µm to 5 µm, and/or from 8 µm to 12 µm. Preferably, at least some of the transmission of radiation arises at wavelengths from 0.3 µm to 1.7 µm. In some embodiments, the optic is characterized by at least 40% average transmission of radiation over a wavenumber band with cumulative wavenumber width of at least 1500 $cm^{-1}$ or at least 2000 $cm^{-1}$ contained within wavelengths (i) from 0.3 µm to 1.7 µm and (ii) from 3 µm to 5 µm and/or from 8 µm to 12 µm. Note that the 0.3-1.7 lam wavelength band encompassed UV, visual, and IR wavelengths. When the optic is characterized by radiation transmission within the UV and/or visual portions of the 0.3-1.7 µm band, as well as radiation transmission within the 3-5 µm or 8-12 µm bands, the optic is broadband-transparent. When the optic is characterized by radiation transmission only within IR bands, the optic may be referred to as IR-transparent.

As meant herein, an "optic" is a lens or other optical component that may be itself an optical device or may be present in a larger device or system. The lens or other optic may be a material or region that changes the behavior or properties of light (such as infrared light). "Optics" may refer to a singular optic or multiple optics contained in a common device. Optics may be windows for light, or lenses that affect the propagation of light, for example. An "optical device" is a device that creates, manipulates, or measures electromagnetic radiation.

In various embodiments, optics may include, but are not limited to, plano-optics (e.g. windows, mirrors, polarizers, beam splitters, or prisms); spherical lenses (e.g. plano-concave/convex, double-concave/convex, or meniscus lenses); aspheric lenses (e.g. parabolic, hyperbolic, or hybrid lenses); achromatic lenses; assemblies (e.g. imaging lenses, beam expanders, eyepieces, or objectives); optical fibers; molded optics; optical waveguides; ring resonators; optical networks; optical interconnects; directional couplers; array waveguide grating (AWG) multi/demultiplexers; switches; tunable filters; variable optical attenuators (VOAs); amplifiers; integrated planar lightwave circuits, such as tunable optical add/drop multiplexers (OADMs), photonic crystal superprism waveguides, digital optical switches (DOSs) integrated with VOAs, or traveling-wave heterojunction phototransistors; and three-dimensionally integrated optical devices.

An "aperture" is a space through which light passes in an optical system. The aperture and focal length of an optical system determine the cone angle of a bundle of rays that come to a focus in the image plane. When the optic is an aperture, polyoxalamide polymer may form at least a portion of surrounding structures (e.g., walls) that form the aperture.

In some embodiments, an optical lens is a single lens, a compound lens, or an array of lenses. The optical lens may be selected from the group consisting of a converging lens, a diverging lens, a collimating lens, and combinations thereof. An optical lens may be convex, concave, biconvex, biconcave, planoconvex, planoconcave, aspheric, Fresnel, Fresnel zone plate, etc. A lens may create a point focus or a line focus (cylindrical lens). A lens may provide a circular image or be configured to provide rectangular coverage, to accommodate a rectangular format sensor, for example. A lens, window, or aperture may be flat, curved on one axis, biaxially curved, curved in three dimensions, or a combination thereof.

In some embodiments, an optical window is a flat plate, a single window, a compound window, or an array of windows. The optical window may be flat, curved on one axis, biaxially curved, curved in three dimensions, complex-shaped, or a combination thereof.

The dimensions of the optic may vary widely, including micrometer scale, millimeter scale, and meter scale. A typical diameter of a broadband-transparent lens, for example, is from about 1 mm to about 500 mm. A typical thickness of a broadband-transparent lens is from about 10 microns to about 100 mm.

FIG. 1 depicts an exemplary optic 100, without limitation. In FIG. 1, incoming IR radiation 110 (which may or may not be present) strikes a lens 120. The lens 120 includes an IR-transparent polyoxalamide polymer 130, optional filler particles 140 (a single filler particle, not drawn to scale, is circled), and an optional coating 150 that is disposed on the side exposed to the incident IR radiation 110. Transmitted IR radiation 160 will be present when there is incoming IR radiation 110. The transmitted IR radiation 160 may be focused onto, or otherwise directed to, an optional sensor 170. The sensor 170 may be linked to a processor or computer configured for processing data related to the sensed transmitted IR radiation 160 and/or other parameters of the optic 100 during operation. The entire optic 100 may be configured with an optional housing 180, as shown in FIG. 1. The optic 100 may be part of a larger optical system.

In typical embodiments, the optic contains filler particles. Filler particles may be selected from the group consisting of toughening particles (e.g., polypropylene, polyethylene, or an ethylene-propylene copolymer), transparency-modifying particles, refractive index-modifying particles (e.g., high-refractive-index nanoparticles), and combinations thereof. In some embodiments, the filler particles are selected from the group consisting of Ge, $CaF_2$, NaCl, KCl, KBr, diamond, Si, CsI, MgO, $MgF_2$, LiF, NaF, $BaF_2$, ZnS, ZnSe, PbS, PbSe (see Example 1), $PbF_2$, $LiYF_4$, $NaYF_4$, ThBrI, ThBrCl, Si, SiC, Ge, GaAs, AlN, AlON, $Al_2O_3$, polyethylene, polypropylene, and combinations thereof. Multiple types of filler particles may be present. Other additives may be present in the optic, such as sulfur, mineral oil, and/or inorganic pigments, for example.

In certain embodiments, the filler particles are high-refractive-index nanoparticles that have a higher index of refraction compared to the polyoxalamide polymer, and wherein the high-refractive-index nanoparticles are selected from the group consisting of titanium dioxide, silicon, germanium, zinc oxide, silicon carbide, silicon dioxide, hafnium oxide, zinc selenide, zinc sulfide, sapphire, calcium fluoride, sodium fluoride, lithium fluoride, cesium fluoride, cesium bromide, potassium bromide, potassium iodide, and combinations thereof.

In some embodiments, the high-refractive-index nanoparticles have an average particle size from about 5 nanometers to about 100 nanometers, such as from about 5 nanometers to about 50 nanometers.

In some embodiments, the high-refractive-index nanoparticles have a refractive index of at least about 1.5, such as about, at least about, or at most about 1.6, 1.7, 1.8, 1.9, 2.0, 2.1, 2.2, 2.3, 2.4, 2.5, 2.6, 2.7, 2.8, 2.9, or 3.0, including all intervening ranges.

In specific embodiments, high-refractive-index nanoparticles are incorporated to provide a gradient index of refraction lens, known as a GRIN lens. GRIN lenses have layers of different index of refraction which varies along the thickness or spherically. To form layers having different index of refraction, polyoxalamide layers may be filled with different mass loadings of nanoparticles. Alternatively, or additionally, polyoxalamide layers may be filled with distinct nanoparticles that possess different index of refraction.

The filler particles may be in the form of spheres, rods, whiskers, platelets, or a combination thereof, for example. The filler particles may have a spherical geometry or they may have a geometric aspect ratio greater than 1 along one or more Cartesian axes (e.g. rods, whiskers, or platelets).

The filler particles may have an average dimension selected from about 2 nanometers to about 1 micron, for example. The average dimension (e.g., diameter, effective diameter, or length) of the filler particles may be chosen from ranges between 2 nm and 10 nm, between 10 nm and 100 nm, or between 100 nm and 1 µm, in various embodiments.

In this disclosure, particles sizes may be measured by a variety of techniques, including dynamic light scattering, laser diffraction, image analysis, or sieve separation, for example. Dynamic light scattering is a non-invasive, well-established technique for measuring the size and size distribution of particles typically in the submicron region, and with the latest technology down to 1 nanometer. Dynamic light scattering is a widely used particle-sizing technique for materials ranging from hundreds of nanometers up to several millimeters in size. Exemplary dynamic light scattering instruments and laser diffraction instruments for measuring particle sizes are available from Malvern Instruments Ltd., Worcestershire, UK. Image analysis to estimate particle sizes and distributions can be done directly on photomicrographs, scanning electron micrographs, or other images.

The filler particles may have an average volumetric loading from about 1 vol % to about 65 vol % based on volume of the polyoxalamide polymer plus volume of the filler particles, for example. In various embodiments, the volumetric loading of the filler particles within the polymer matrix (containing the polyoxalamide polymer) may be chosen from ranges of 1-5% by volume, 5-25% by volume, 25-40% by volume, or 40-65% by volume, for example.

The filler particles (when present) may be selected based upon their ability to toughen the underlying polymer matrix by means of crack tip blunting (reduced stress intensity factor), crack tip deflection (increased crack path length), or formation of local elastic heterogeneities that impose a residual compressive stress state around the fillers.

In some embodiments, the filler particles contain a ligand to aid in dispersion with the polyoxalamide polymer. The ligands may have saturated or unsaturated hydrocarbon tails, or fluorinated alkane tails, for example. The ligands may have head groups selected from amines, carboxylic acids, carboxylates, borofluorides, or combinations thereof, for example.

In some embodiments, the optic further includes, or is disposed in physical contact with, an anti-scratch layer, an anti-abrasion layer, an anti-reflection layer, or a combination thereof. Multiple layers may be present, such as stacked layers, to provide a range of properties. Alternatively, or additionally, a layer may have multiple functions.

An anti-scratch layer may contain diamond, diamond-like carbon, sapphire, silicon, ZnS, SiC, AlON, or a combination thereof, for example. In some embodiments, the optic includes a stack of films that collectively provides anti-reflection properties.

In some embodiments, the optic further includes an anti-rain erosion layer. The anti-rain erosion layer may be a coating or layer on the outer surface of the optic (e.g., coating 150 in FIG. 1). The anti-rain erosion layer may contain an elastomeric material, such as an elastomeric material with a storage modulus from about 1 MPa to about 500 MPa, and a minimum elongation of 100%.

The elastomeric material may be or contain a thermoplastic or thermoset polymer. In some embodiments, a polyoxalamide polymer is used as or in the elastomeric material. In some embodiments, a thermoplastic elastomeric material includes a polyoxalamide with one or more dioxalates and one or more diamines. In some embodiments, a thermoset elastomeric material includes a polyoxalamide with one or more dioxalates and one or more triamines or polyamines with greater than trifunctionality. In some embodiments, the elastomeric material is a thermoplastic or thermoset comprising a polyphosphazene-based polymer or copolymer.

The elastomeric material may be covalently or physically bonded to the underlying optic. Crosslinked polyoxalamide may function as a bonding layer for the elastomeric material.

In some embodiments, the elastomeric material contains solid inorganic fillers. That is, the elastomeric material may be a matrix that includes a thermoplastic or thermoset polymer as well as solid inorganic fillers dispersed within the matrix. The solid inorganic fillers are typically less than 100 nm in particle size and may range from about 0.1 vol % to about 50 vol %, such as from about 1 vol % to about 25 vol %, based on total volume of the optic. In some embodiments, the solid inorganic fillers are selected from the group consisting of Ge, $CaF_2$, NaCl, KCl, KBr, diamond, Si, CsI, MgO, $MgF_2$, LiF, NaF, $BaF_2$, ZnS, ZnSe, PbS, PbSe, $PbF_2$, $LiYF_4$, $NaYF_4$, ThBrI, ThBrCl, Si, SiC, Ge, GaAs, AN, AlON, $Al_2O_3$, and combinations thereof.

In certain embodiments, the elastomeric material has a storage modulus from about 1 MPa to about 500 MPa, such as from about 10 MPa to about 100 MPa, and a minimum elongation of 10%, 50%, 100%, 200%, or more. In various embodiments, the elastomeric material has a storage modulus of about, or at least about 1, 5, 10, 25, 50, 75, 100, 150, 200, 250, 300, 350, 400, 450, or 500 MPa, including all intervening ranges.

In some embodiments, the optic further includes an anti-fouling layer on an exterior surface of the optic. An anti-fouling layer on the exterior surface resists the wetting and build-up of water, oils, dirt, and debris. The anti-fouling layer may contain a hydrophobic material (e.g., a fluoropolymer), for example. In some embodiments, the anti-fouling layer is polytetrafluoroethylene (PTFE) or fluorinated ethylene propylene (FEP), a copolymer of hexafluoropropylene and tetrafluoroethylene. In some embodiments, the anti-fouling layer is not a fluoropolymer but rather a polyolefin, large alkane, or other non-fluorinated species that renders the optic surface hydrophobic.

In some embodiments, the optic comprises at least 2 wt %, at least 5 wt %, at least 10 wt %, or at least 20 wt % of the polyoxalamide polymer. In various embodiments, the optic comprises about, at least about, or at most about 1, 2, 3, 4, 5, 10, 15, 20, 25, 30, 35, 40, 45, or 50 wt % polyoxalamide polymer, including all intervening ranges (e.g., the optic may contain about 3-40 wt % polyoxalamide polymer, etc.).

In some embodiments, the polyoxalamide polymer is contained in a protective layer coating or surrounds an inorganic substrate. The inorganic substrate may be selected from the group consisting of silica, quartz, sapphire, $Al_2O_3$, AlON, ZnS, ZnSe, Si, Ge, SiC, GaAs, $CaF_2$, and combinations thereof, for example.

In some embodiments, the polyoxalamide polymer is contained in a protective organic coating or surrounds an organic substrate.

The branched, aliphatic hydrocarbon species may have a degree of branching β of at least 0.05, for example. The branched, aliphatic hydrocarbon species may have a number-average molecular weight ($M_n$) from about 50 g/mol to about 5,000 g/mol, for example.

The branched, aliphatic hydrocarbon species may be derived from a branched monomer selected from the group consisting of (12E,15E)-N-[(21E,24E)-hexatriaconta-21,24-dienyl]hexatriaconta-12,15-dien-1-amine, 2,2,4-trimethyl hexamethylene diamine, 2,4,4-trimethyl hexamethylene diamine, 2-methyl-L5-pentanediamine, isophorone diamine, chemical analogues thereof, oligomers thereof, and combinations of the foregoing. Exemplary branched monomers include Priamine 1071, Priamine 1073, Priamine 1074, and Priamine 1075.

In some embodiments, the N—C(=O)—C(=O)—N— sequences are reaction products derived from starting oxalate species comprising dialkyl oxalates. The dialkyl oxalates may be selected from the group consisting of dimethyl oxalate, diethyl oxalate, dibutyl oxalate, di-tert-butyl oxalate, chemical analogues thereof, and combinations of the foregoing.

In some embodiments, the multifunctional amine chain extenders or crosslinkers are selected from the group consisting of 4-(aminomethyl)octane-1,8-diamine, 3-(aminomethyl)octane-1,8-diamine, 2-(aminomethyl)octane-1,8-diamine, 1-(aminomethyl)octane-1,8-diamine, tetraethylenetriamine, tetraethylenetetramine, tetraethylenepentamine, N-(hydroxyethyl)diethylenetriamine, chemical analogues thereof, and combinations of the foregoing.

In some embodiments, the polyoxalamide polymer has a degree of polymer crosslinking $\chi$ of at least 0.2. In various embodiments, x is about, at least about, or at most about 0, 0.05, 0.1, 0.15, 0.2, 0.25, 0.3, 0.4, 0.5, 0.6, 0.7, 0.8, or 0.9, including all intervening ranges.

In some embodiments, the polyoxalamide polymer does not contain sulfur crosslinks. In some embodiments, the polyoxalamide polymer does not contain ether bonds. In these or other embodiments, the polyoxalamide polymer does not contain ester bonds.

In some embodiments, the optic includes an inorganic substrate coated with an organic layer containing the polyoxalamide. In these embodiments, the optic preferably contains at least 5 wt % total organic material, such as at least 10 wt % or at least 20 wt % total organic material. In other embodiments, the optic includes an organic substrate coated with an layer containing the polyoxalamide. In these embodiments, the optic preferably contains at least 25 wt % total organic material, such as at least 40 wt % or at least 50 wt % total organic material.

Some variations of the invention provide a method of making an optic, the method comprising:
(a) providing a first reactant comprising a branched, aliphatic hydrocarbon species that is amine-terminated;
(b) providing a second reactant comprising an oxalate species;
(c) reacting the first reactant with the second reactant, under effective prepolymerization conditions and optionally in the presence of a prepolymerization solvent, to generate a polyoxalamide prepolymer;
(d) reacting the polyoxalamide prepolymer with a multifunctional amine chain extender or crosslinker having an amine functionality of 3 or greater, under effective polymerization conditions and optionally in the presence of a polymerization solvent, to generate a polyoxalamide polymer; and
(e) forming an optic comprising at least 5 wt % of the polyoxalamide polymer, wherein the optic is formed as an optical lens or an optical window.

In some methods, the first reactant is selected from the group consisting of (12E,15E)-N-[(21E,24E)-hexatriaconta-21,24-dienyl]hexatriaconta-12,15 dien-1-amine, 2,2,4-trimethyl hexamethylene diamine, 2,4,4-trimethyl hexamethylene diamine, 2-methyl-1,5-pentanediamine, isophorone diamine, chemical analogues thereof, oligomers thereof, and combinations of the foregoing.

In some methods, the oxalate species are selected from dialkyl oxalates. For example, the dialkyl oxalates may be selected from the group consisting of dimethyl oxalate, diethyl oxalate, dibutyl oxalate, di-tert-butyl oxalate, chemical analogues thereof, and combinations of the foregoing.

In some methods, the multifunctional amine chain extender or crosslinker is selected from the group consisting of 4-(aminomethyl)octane-1,8-diamine, 3-(aminomethyl)octane-1,8-diamine, 2-(aminomethyl)octane-1,8-diamine, 1-(aminomethyl)octane-1,8-diamine, tetraethylenetriamine, tetraethylenetetramine, tetraethylenepentamine, N-(hydroxyethyl)diethylenetriamine, chemical analogues thereof, and combinations of the foregoing.

In some methods, the polyoxalamide prepolymer comprises: one or more first segments containing at least one repeat unit that includes (i) a branched, aliphatic hydrocarbon species and (ii) amide groups at internal ends of the repeat unit; and one or more prepolymer end groups containing ester groups that are each covalently bonded directly to one of the amide groups to form —N—C(=O)—C(=O)—O— sequences.

In some methods, step (e) comprises casting the polyoxalamide polymer, pressing the polyoxalamide polymer into a mold, filming the polyoxalamide polymer, or a combination thereof.

The method may further comprise adding filler particles in a first solvent to the polyoxalamide prepolymer in a second solvent, thereby creating a mixture; optionally removing the first solvent and/or the second solvent from the mixture; casting or spraying a film of the mixture; and curing the film to form the optic. Solvent removal may be accomplished by heating, evaporation, vacuum, or a combination thereof, for example. The first solvent and the second solvent may be chemically different, or they may be the same. The prepolymer is preferably soluble in both the first solvent and the second solvent.

In some embodiments, the first solvent is selected from the group consisting of toluene, xylenes, ethanol, butanol, tetrahydrofuran, methyl ethyl ketone, methyl isobutyl ketone, and combinations thereof. In these or other embodiments, the second solvent is independently selected from the group consisting of toluene, xylenes, ethanol, butanol, tetrahydrofuran, methyl ethyl ketone, methyl isobutyl ketone, and combinations thereof.

In some methods, filler particles are combined with the polyoxalamide polymer, thereby creating a mixture. The mixture may then be cast or pressed into a mold to fabricate the optic. The filler particles may be selected from the group consisting of toughening particles, transparency-modifying particles, refractive index-modifying particles, and combinations thereof. The filler particles may contain a ligand or a surface coating to aid in solubility with the first solvent. Filler particles are preferably soluble in both the first solvent and the second solvent.

Other variations provide a method of coating an optic, the method comprising:
(a) providing a first reactant comprising a branched, aliphatic hydrocarbon species that is amine-terminated;
(b) providing a second reactant comprising an oxalate species;
(c) reacting the first reactant with the second reactant, under effective prepolymerization conditions and optionally in the presence of a prepolymerization solvent, to generate a polyoxalamide prepolymer;
(d) reacting the polyoxalamide prepolymer with a multifunctional amine chain extender or crosslinker having an amine functionality of 3 or greater, under effective polymerization conditions and optionally in the presence of a polymerization solvent, to generate a polyoxalamide polymer; and
(e) forming an optic coating comprising at least 1 wt % of the polyoxalamide polymer, wherein the optic coating is disposed on an optical lens or an optical window.

The first reactant may be selected from the group consisting of (12E,15E)-N-[(21E,24E)-hexatriaconta-21,24-dienyl]hexatriaconta-12,15 dien-1-amine, 2,2,4-trimethyl hexamethylene diamine, 2,4,4-trimethyl hexamethylene diamine, 2-methyl-L5-pentanediamine, isophorone diamine, chemical analogues thereof, oligomers thereof, and combinations of the foregoing.

The oxalate species may be selected from dialkyl oxalates, such as (but not limited to) dimethyl oxalate, diethyl oxalate, dibutyl oxalate, di-tert-butyl oxalate, chemical analogues thereof, or combinations of the foregoing.

The multifunctional amine chain extender or crosslinker may be selected from the group consisting of 4-(aminomethyl)octane-1,8-diamine, 3-(aminomethyl)octane-1,8-diamine, 2-(aminomethyl)octane-1,8-diamine, 1-(aminomethyl)octane-1,8-diamine, tetraethylenetriamine, tetraethylenetetramine, tetraethylenepentamine, N-(hydroxyethyl)diethylenetriamine, chemical analogues thereof, and combinations of the foregoing.

The polyoxalamide prepolymer may comprise: one or more first segments containing at least one repeat unit that includes (i) a branched, aliphatic hydrocarbon species and (ii) amide groups at internal ends of the repeat unit; and one or more prepolymer end groups containing ester groups that are each covalently bonded directly to one of the amide groups to form —N—C(=O)—C(=O)—O— sequences.

Step (e) may comprise filming the polyoxalamide polymer to form the optic coating, for example.

In some methods, the method further comprises adding filler particles in a first solvent to the polyoxalamide prepolymer in a second solvent, thereby creating a mixture; optionally removing the first solvent and/or the second solvent from the mixture; spraying, spinning, or dip-coating a film of the mixture onto the optical lens or optical window; and curing the film to form the optic coating. The first solvent and the second solvent may be chemically different, or they may be the same. The prepolymer is preferably soluble in both the first solvent and the second solvent. Solvent removal may be accomplished by heating, evaporation, vacuum, or a combination thereof, for example. Optionally, an adhesion layer may be introduced between the optic coating and the optical lens or optical window.

In methods of forming an optic coating, the filler particles may be selected from the group consisting of toughening particles, transparency-modifying particles, refractive index-modifying particles, and combinations thereof, for example. The filler particles may contain a ligand or a surface coating to aid in solubility with the first solvent. Filler particles are preferably soluble in both the first solvent and the second solvent.

In some methods of coating an optic, the first solvent is selected from the group consisting of toluene, xylenes, ethanol, butanol, tetrahydrofuran, methyl ethyl ketone, methyl isobutyl ketone, and combinations thereof. In these or other embodiments, the second solvent is independently selected from the group consisting of toluene, xylenes, ethanol, butanol, tetrahydrofuran, methyl ethyl ketone, methyl isobutyl ketone, and combinations thereof. "Xylenes" include m-xylene, o-xylene, and p-xylene.

The polyoxalamide polymer synthesized and/or utilized in various embodiments (including compositions and methods) herein will now be further described, without limitation.

Some variations provide or utilize a polyoxalamide polymer comprising:
 (a) one or more first segments containing at least one repeat unit that includes (i) a branched, aliphatic hydrocarbon species and (ii) first amide groups at internal ends of the repeat unit, wherein the first amide groups are part of oxalamide groups;
 (b) one or more polymer end groups containing second amide groups that are each covalently bonded directly to one of the first amide groups, wherein the second amide groups are also part of the oxalamide groups, and wherein the oxalamide groups contain —N—C(=O)—C(=O)—N— sequences; and
 (c) a reacted form of one or more multifunctional amine chain extenders or crosslinkers with an amine functionality of 3 or greater.

The branched, aliphatic hydrocarbon species is characterized by a degree of branching $\beta$. "Branching" refers to the departure from a linear hydrocarbon species. A linear (unbranched) hydrocarbon species is one in which each carbon atom is bonded to only one other carbon atom, in addition to hydrogen atoms or hydrogen substitutions (e.g., halogen atoms).

The degree of branching $\beta$ is a parameter that is 0 when there is no branching and 1 when there is maximum branching. A hydrocarbon species with $\beta=0$ means that the species is unbranched. A hydrocarbon species with $\beta>0$ means that the species is branched. One test to determine whether a hydrocarbon species is branched is that for a given branched hydrocarbon species, there will exist an isomer that is a linear, unbranched molecule with the same total number of carbon atoms but in a longer main chain (more carbon atoms) than the main chain of the branched hydrocarbon species. If no such isomer exists, then the hydrocarbon species is considered to be unbranched ($\beta=0$). Note that for purposes of this disclosure, cyclic hydrocarbon species are branched.

In some embodiments, the degree of branching $\beta$ of a hydrocarbon species may be calculated as the number of carbon branch points in the hydrocarbon species divided by the total number of carbon atoms. Terminal carbon atoms are included in the calculation of $\beta$ even though they cannot themselves be branched, by definition. As an illustration of calculating $\beta$, 2,2-dimethylpropane, a branched alkane with five carbon atoms, has a central carbon and four terminal carbons. Its degree of branching $\beta=1/5=0.2$. Although the central carbon is actually double-branched, it counts as one branch point for purposes of calculating $\beta$. This constraint is necessary to ensure the highest possible value of $\beta$ for a general carbonaceous molecule is 1 (e.g., in the case of graphite where all carbons are branch points).

In some embodiments of the invention, the branched, aliphatic hydrocarbon species has a degree of branching $\beta$ of about, at least about, or at most about 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, or 0.20, including all intervening ranges. In certain embodiments, the branched, aliphatic hydrocarbon species has a degree of branching $\beta$ of about, at least about, or at most about 0.1, 0.2, 0.3, 0.4, or 0.5, including all intervening ranges. As one example, Priamine 1074 (FIG. 3) has 36 carbon atoms and 4 carbon branch points, and thus $\beta=4/36=0.11$.

In this disclosure, "aliphatic" means that the hydrocarbon species contains no carbon-carbon aromatic bonds (delocalized conjugated $\pi$ system with resonance bond order of 1.5). Aliphatic hydrocarbon species may contain carbon-carbon single bonds, carbon-carbon double bonds, and/or carbon-carbon triple bonds. Preferably, aliphatic hydrocarbon species contain carbon-carbon single bonds. Aliphatic hydrocarbon species may be linear, cyclic (but not aromatic), or branched. In an aliphatic hydrocarbon species, any hydrogen atom may be substituted with another element or functional group, such as Cl, $NH_2$, OH, etc.

In some embodiments, the first segments contain at least 2 repeat units, such as at least 10 repeat units. In various embodiments, the first segments contain 2, 3, 4, 5, 6, 7, 8, 9, 10, 15, 20, 25, 50, 75, 100, or more repeat units.

In some embodiments, the —N—C(=O)—C(=O)—N— sequences are —N(H)—C(=O)—C(=O)—N(H)— sequences.

The branched, aliphatic hydrocarbon species may have a number-average molecular weight from about 50 g/mol to about 5,000 g/mol, for example.

The branched, aliphatic hydrocarbon species is preferably derived from a branched monomer that is an amine-terminated, branched, aliphatic monomer. The branched, aliphatic hydrocarbon species may be derived from a branched monomer selected from the group consisting of (12E,15E)-N-[(21E,24E)-hexatriaconta-21,24-dienyl]hexatriaconta-12,15-dien-1-amine, 2,2,4-trimethyl hexamethylene diamine, 2,4,4-trimethyl hexamethylene diamine, 2-methyl-1,5-pentanediamine, isophorone diamine, chemical analogues thereof, oligomers thereof, and combinations of the foregoing.

In other (less-preferred) embodiments that employ an unbranched, aliphatic hydrocarbon species, such species may be derived from a linear monomer selected from the group consisting of ethylenediamine, propanediamine, butanediamine, pentanediamine, hexanediamine, heptanediamine, octanediamine, dibutylamine (or other dialkylamines), tetraethylethylenediamine (or other tetraalkylethylenediamines), and combinations thereof, for example.

In some embodiments, the N—C(=O)—C(=O)—N— sequences are reaction products derived from starting oxalate species comprising dialkyl oxalates. The dialkyl oxalates may be selected from the group consisting of dimethyl oxalate, diethyl oxalate, dibutyl oxalate, di-tert-butyl oxalate, chemical analogues thereof, and combinations of the foregoing.

The multifunctional amine chain extenders or crosslinkers may be selected from the group consisting of 4-(aminomethyl)octane-1,8-diamine, 3-(aminomethyl)octane-1,8-diamine, 2-(aminomethyl)octane-1,8-diamine, 1-(aminomethyl)octane-1,8-diamine, tetraethylenetriamine, tetraethylenetetramine, tetraethylenepentamine, N-(hydroxyethyl)diethylenetriamine, chemical analogues thereof, and combinations of the foregoing.

In certain embodiments, the multifunctional amine chain extenders or crosslinkers have an amine functionality of 2. Preferably, the multifunctional amine chain extenders or crosslinkers have an amine functionality of 3 or more. In some embodiments, the multifunctional amine chain extenders or crosslinkers have an amine functionality of 4 or greater.

In some embodiments, the polyoxalamide polymer is crosslinked and may be defined by a degree of polymer crosslinking $\chi$. The degree of polymer crosslinking $\chi$ is a parameter that is 0 when there is no crosslinking and 1 when there is maximum crosslinking within the polymer. In some embodiments, $\chi$ is defined by the extent of the crosslinking reaction of prepolymer with chain extender or crosslinker. If no reaction takes place, then $\chi=0$. If all available functional groups within the chain extender or crosslinker fully react with all possible polymer chains, then $\chi=1$. In some embodiments, $\chi$ is at least 0.1, at least 0.5, or at least 0.9. In various embodiments, $\chi$ is about, or at least about, 0.1, 0.2, 0.3, 0.4, 0.5, 0.6, 0.7, 0.8, 0.9, 0.95, 0.99, or 1, including all intervening ranges. In certain embodiments, $\chi<0.2$.

In certain embodiments, the polyoxalamide polymer does not contain sulfur crosslinks. In certain embodiments, the polyoxalamide polymer does not contain ether bonds. In certain embodiments, the polyoxalamide polymer does not contain ester bonds. In certain embodiments, the polyoxalamide polymer does not contain siloxane bonds. These constraints are all independent.

Some variations provide or utilize a polyoxalamide polymer composition comprising a polyoxalamide polymer containing:
(a) one or more first segments containing at least one repeat unit that includes (i) a branched, aliphatic hydrocarbon species and (ii) first amide groups at internal ends of the repeat unit, wherein the first amide groups are part of oxalamide groups;
(b) one or more polymer end groups containing second amide groups that are each covalently bonded directly to one of the first amide groups, wherein the second amide groups are also part of the oxalamide groups, and wherein the oxalamide groups contain —N—C(=O)—C(=O)—N— sequences; and
(c) a reacted form of one or more multifunctional amine chain extenders or crosslinkers with an amine functionality of 3 or greater.

In some embodiments, the polyoxalamide polymer composition further contains one or more additives selected to adjust light-transmission properties, mechanical properties, and/or adhesion properties. The additives may be selected from the group consisting of polypropylene, polyethylene, ethylene-propylene copolymer, high-refractive-index nanoparticles, sulfur, mineral oil, inorganic pigments, and combinations thereof, for example.

In some embodiments, the polyoxalamide polymer composition further includes one or more filler particles physically blended with the polymer. The concentration of filler particles may vary, such as from about 0.1 wt % to about 50 wt % on the basis of the overall polyoxalamide polymer composition.

Filler particles for use in the compositions of the present disclosure preferably exhibit high broadband transparency and small particle size relative to incident radiation wavelength in order to increase transparency and limit scattering. In particular, for example, the filler particles material may be chosen so as to be transparent in the MWIR and LWIR bands, and/or other bands. However, the present invention is not limited to filler particles (when present) that are transparent in any particular bands. If the concentration of filler particles is relatively low (e.g., less than about 30 wt %, 20 wt %, 10 wt %, 5 wt %, or 1 wt %), the filler particles may lack broadband transparency, while the overall material still maintains acceptable transparency.

Filler particles for use in the compositions of the present disclosure may be selected in the nanoparticle size range. In some embodiments, the filler particles have an average discrete particle size ranging from about 10 nm to about 1000 nm, such as from about 100 nm to about 500 nm.

In various embodiments, the polyoxalamide polymer composition is present as or in a lens, a window, a coating, a film, a film adhesive, a protective material, or a combination thereof, any of which may function as an optic.

The polyoxalamide polymer composition may be characterized by a transparency selected from the group consisting of UV transparency, visual transparency, NIR transparency, MWIR transparency, LWIR transparency, and combinations thereof (e.g., both UV transparency and NIR transparency, or NIR/MWIR/LWIR transparency, etc.).

By "transparent" in this disclosure, it is not necessarily meant completely transparent; some absorption of radiation may occur. In particular, transparent means a sheet of polymer with known thickness (such as 25 microns) transmits at least 40%, preferably at least 50%, more preferably at least 60%, and most preferably at least 70% of incident light at wavelengths of interest. Incident light is normal (perpendicular) to the surface of the polymer sheet. If a wavelength range is used, the transmission is averaged over that range.

One of ordinary skill in the art will understand that transmission generally can include regular transmission and diffuse transmission, both of which can contribute to total transmission (and thus transparency). The average transmission values in this specification include only regular transmission, which is also referred to as transmittance (e.g., see FIG. 10). Note also that the average transmission (transparency) is an average over a range of wavelengths and may be calculated, for example, as the average value of the transmission (transparency) within a selected range of wavelengths.

Some embodiments provide an polyoxalamide polymer composition with at least 50%, at least 60%, at least 70%, at least 80%, or at least 90% average transparency through a 100-micron-thick film for incident light within the UV band and the Vis band (averaged over both bands).

Some embodiments provide an polyoxalamide polymer composition with at least 50%, at least 60%, at least 70%, at least 80%, or at least 90% average transparency through a 100-micron-thick film for incident light within the Vis band and the NIR band (averaged over both bands).

Some embodiments provide an polyoxalamide polymer composition with at least 50%, at least 60%, at least 70%, at least 80%, or at least 90% average transparency through a 100-micron-thick film for incident light within the UV band, the Vis band, and the NIR band (averaged over all three of these bands).

Some embodiments provide an polyoxalamide polymer composition with at least 50%, at least 60%, at least 70%, at least 80%, or at least 90% average transparency through a 100-micron-thick film for incident light within the Vis band, the NIR band, and the MWIR band (averaged over all three of these bands).

Some embodiments provide an polyoxalamide polymer composition with at least 50%, at least 60%, at least 70%, at least 80%, or at least 90% average transparency through a 100-micron-thick film for incident light within the NIR band, the MWIR band, and the LWIR band (averaged over all three of these bands).

Some embodiments provide an polyoxalamide polymer composition with at least 50%, at least 60%, at least 70%, at least 80%, or at least 90% average transparency through a 100-micron-thick film for incident light within the Vis band, the NIR band, the MWIR band, and the LWIR band (averaged over all four of these bands).

Some embodiments provide an polyoxalamide polymer composition with at least 50%, at least 60%, at least 70%, at least 80%, or at least 90% average transparency through a 100-micron-thick film for incident light within the UV band, the Vis band, the NIR band, and the MWIR band (averaged over all four of these bands).

Certain embodiments provide an polyoxalamide polymer composition with at least 50%, at least 60%, at least 70%, at least 80%, or at least 90% average transparency through a 100-micron-thick film for incident light within the UV band, the Vis band, the NIR band, the MWIR band, and the MWIR band (averaged over all five of these bands). See, for example, FIG. 10.

Other film thicknesses may be used to determine average transparency. Certain embodiments provide an polyoxalamide polymer composition with at least 50%, at least 60%, at least 70%, or at least 80% average transparency through a 250-micron-thick film for incident light within the UV band, the Vis band, the NIR band, the MWIR band, and the MWIR band—averaged over all five of these bands. See, for example, FIG. 10 (10 mil is about 250 microns).

The polyoxalamide polymer composition may be sprayable and/or solution-castable, for example. The polyoxalamide polymer composition may be filmed into sheets or plates, or injection-molded into various part geometries.

Some variations provide a polyoxalamide prepolymer comprising:
 (a) one or more first segments containing at least one repeat unit that includes (i) a branched, aliphatic hydrocarbon species and (ii) amide groups at internal ends of the repeat unit; and
 (b) one or more prepolymer end groups containing ester groups that are each covalently bonded directly to one of the amide groups to form —N—C(=O)—C(=O)—O— sequences.

In some polyoxalamide prepolymers, the branched, aliphatic hydrocarbon species have a degree of branching β of at least 0.05, such as at least 0.1.

In some embodiments, the first segments contain at least 2 repeat units.

The —N—C(=O)—C(=O)—O— sequences may be —N(H)—C(=O)—C(=O)—O— sequences, in the polyoxalamide prepolymer.

In some embodiments, the branched, aliphatic hydrocarbon species has a number-average molecular weight from about 50 g/mol to about 5,000 g/mol, in the polyoxalamide prepolymer.

In some polyoxalamide prepolymers, the branched, aliphatic hydrocarbon species is derived from a branched monomer selected from the group consisting of (12E,15E)-N-[(21E,24E)-hexatriaconta-21,24-dienyl]hexatriaconta-12,15-dien-1-amine, 2,2,4-trimethyl hexamethylene diamine, 2,4,4-trimethyl hexamethylene diamine, 2-methyl-1,5-pentanediamine, isophorone diamine, chemical analogues thereof, oligomers thereof, and combinations of the foregoing.

The —N—C(=O)—C(=O)—O— sequences in the polyoxalamide prepolymer may be reaction products derived from starting oxalate species comprising dialkyl oxalates. The dialkyl oxalates may be selected from the group consisting of dimethyl oxalate, diethyl oxalate, dibutyl oxalate, di-tert-butyl oxalate, chemical analogues thereof, and combinations of the foregoing.

In certain embodiments, the polyoxalamide prepolymer does not contain ether bonds. In certain embodiments, the polyoxalamide prepolymer does not contain ester bonds except for an ester bond contained in an ester group bonded to an amide group.

Some variations provide a polyoxalamide prepolymer composition comprising a polyoxalamide prepolymer, and further comprising one or more multifunctional amine chain extenders or crosslinkers with an amine functionality of 2 or greater, preferably 3 or greater.

The multifunctional amine chain extenders or crosslinkers may be selected from the group consisting of 4-(aminomethyl)octane-1,8-diamine, 3-(aminomethyl)octane-1,8-diamine, 2-(aminomethyl)octane-1,8-diamine, 1-(aminomethyl)octane-1,8-diamine, tetraethylenetriamine, tetraethylenetetramine, tetraethylenepentamine, N-(hydroxyethyl)diethylenetriamine, chemical analogues thereof, and combinations of the foregoing. In the polyoxalamide prepolymer composition, the multifunctional amine chain extenders or crosslinkers are present in unreacted form until the crosslinking reaction is initiated.

In some embodiments, no sulfur is used and the materials may be cured at room temperature (about 25° C.) rather than via aggressive heating (e.g., 150° C.). Sulfur is undesirable because it creates a tinted material that does not have good visual transparency. Also, the use of sulfur during synthesis tends to create noxious fumes that evolve at high temperatures.

In some embodiments, no organometallic monomers containing carbon-metal bonds are employed.

In some embodiments, there are no polyesters, polyethers, or polysiloxanes in the polyoxalamide polymer composition.

Other variations of the invention provide a method of making a polyoxalamide polymer, the method comprising:
(a) providing a first reactant comprising a branched, aliphatic hydrocarbon species that is amine-terminated;
(b) providing a second reactant comprising an oxalate species;
(c) reacting the first reactant with the second reactant, under effective prepolymerization conditions and optionally in the presence of a first solvent, to generate a polyoxalamide prepolymer; and
(d) reacting the polyoxalamide prepolymer with a multifunctional amine chain extender or crosslinker having an amine functionality of 3 or greater, under effective polymerization conditions and optionally in the presence of a second solvent, to generate a polyoxalamide polymer.

Figure 3:
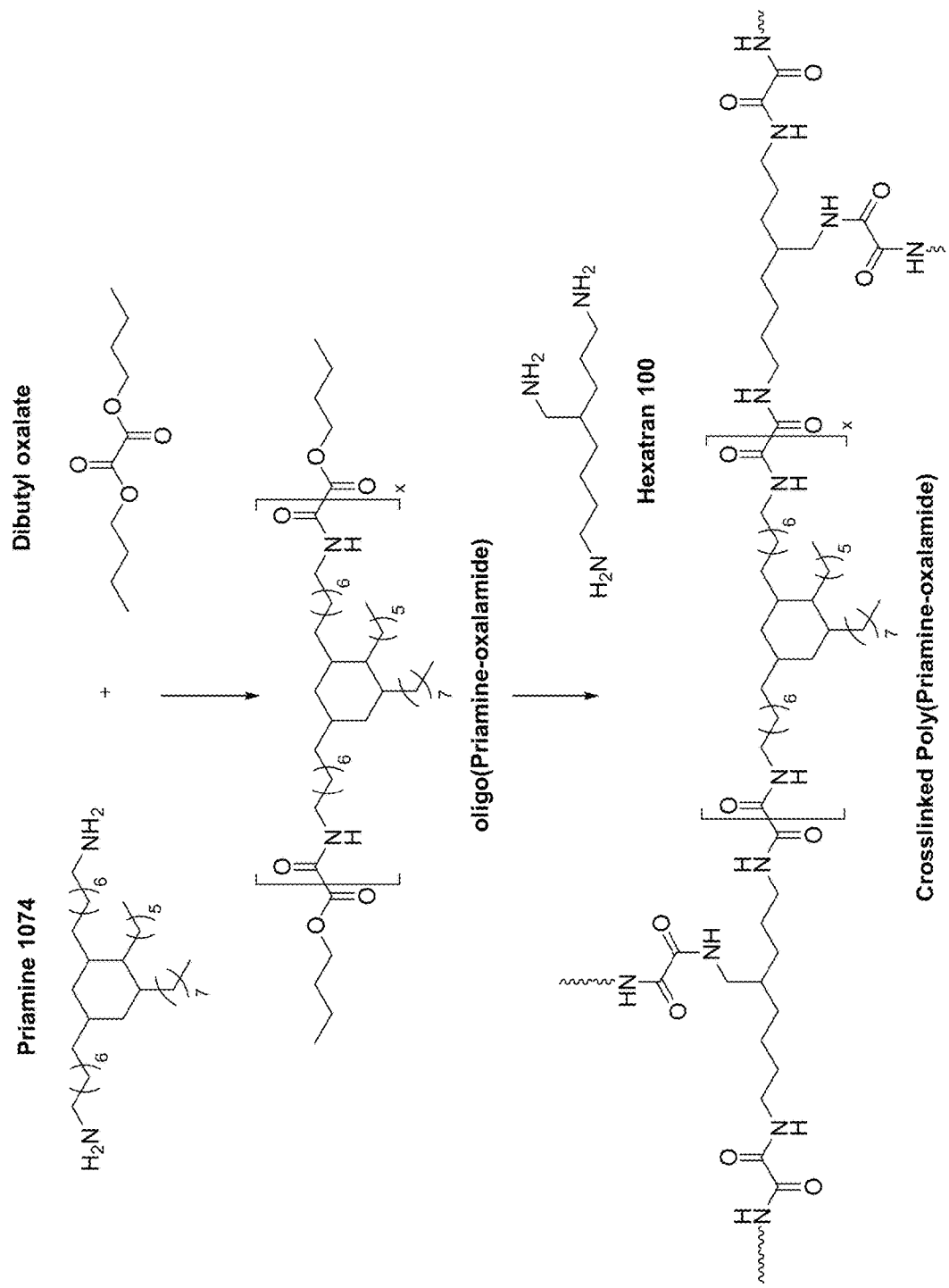
FIG. 3 depicts an overall reaction scheme for producing a polyoxalamide polymer, in some embodiments, including Example 8.

For example, FIG. 3 depicts an overall reaction scheme, such as the scheme employed in Example 8.

The method may further comprise introducing one or more additives to the polyoxalamide polymer, wherein the additives may be selected to adjust light-transmission properties, mechanical properties, and/or adhesion properties. In some embodiments, additives are selected from the group consisting of polypropylene, polyethylene, ethylene-propylene copolymer, high-refractive-index nanoparticles, sulfur, mineral oil, inorganic pigments, and combinations thereof. The high-refractive-index nanoparticles may be selected from the group consisting of titanium dioxide, silicon, germanium, zinc oxide, silicon carbide, silicon dioxide, hafnium oxide, zinc selenide, zinc sulfide, sapphire, and combinations thereof. Alternatively, or additionally, the high-refractive-index nanoparticles may be selected from salts, such as $CaF_2$, NaF, LiF, CsF, CsBr, KBr, KI, or combinations thereof.

In some methods, the branched, aliphatic hydrocarbon species has a degree of branching $\beta$ of at least 0.05, such as at least 0.1.

In some methods, the first reactant is selected from the group consisting of (12E,15E)-N-[(21E,24E)-hexatriaconta-21,24-dienyl]hexatriaconta-12,15 dien-1-amine, 2,2,4-trimethyl hexamethylene diamine, 2,4,4-trimethyl hexamethylene diamine, 2-methyl-1,5-pentanediamine, isophorone diamine, chemical analogues thereof, oligomers thereof, and combinations of the foregoing.

In some methods, the oxalate species are selected from dialkyl oxalates, such as dialkyl oxalates selected from the group consisting of dimethyl oxalate, diethyl oxalate, dibutyl oxalate, di-tert-butyl oxalate, chemical analogues thereof, and combinations of the foregoing.

In certain embodiments, the oxalate species are selected from polyfunctional oxalates, such as trifunctional oxalates. A polyfunctional oxalate is a species with a central core and three or more arms. Along each arm, there is an oxalate group. Therefore, in a polyfunctional oxalate, there are three or more —C(O)—C(O)— groups able to react with amines or a partially reacted group, —NH—C(O)—C(O)—, to also react with amines.

In some methods, the multifunctional amine chain extender or crosslinker is selected from the group consisting of 4-(aminomethyl)octane-1,8-diamine, 3-(aminomethyl)octane-1,8-diamine, 2-(aminomethyl)octane-1,8-diamine, 1-(aminomethyl)octane-1,8-diamine, tetraethylenetriamine, tetraethylenetetramine, tetraethylenepentamine, N-(hydroxyethyl)diethylenetriamine, chemical analogues thereof, and combinations of the foregoing.

The multifunctional amine chain extender or crosslinker may have an amine functionality of 4 or greater.

In some methods, the polyoxalamide polymer has a degree of polymer crosslinking $\chi$ of at least 0.1, at least 0.5, or at least 0.9.

The kinetic reaction rate between amines and oxalates is quite rapid, leaving very short pot lives between the two reactants that makes it difficult to cast or spray materials as in traditional two-component systems (urethanes, silicones, etc.). This shortcoming can be overcome by rapid processing of cast films or dual-spray head techniques, for example.

The method may further comprise casting or spraying a mixture of the polyoxalamide prepolymer and the multifunctional amine chain extender or crosslinker, optionally with the second solvent, onto a substrate. Alternatively, or additionally, the method may comprise casting or spraying the polyoxalamide polymer, optionally with a third solvent, onto a substrate. Spraying may utilize a spray gun with dual spray heads. Casting may be performed with a doctor blade or drawdown bar, for example.

The first solvent, second solvent, and third solvent may independently be selected from the group consisting of toluene, xylenes, ethanol, butanol, tetrahydrofuran, methyl ethyl ketone, methyl isobutyl ketone, and combinations thereof, for example. Various solvent dilutions may be used, such as from about 1 wt % to about 100 wt % of the material being diluted within the overall solution.

In some methods, effective prepolymerization conditions include a temperature selected from about 10° C. to about 100° C. In certain methods, the prepolymerization temperature is selected from about 15° C. to about 50° C., such as from about 20° C. to about 30° C. Mixing, such as centrifugal mixing, may be employed to assist the prepolymerization reaction(s).

In some methods, effective polymerization conditions include a temperature selected from about 10° C. to about 100° C. In certain methods, the polymerization temperature is selected from about 15° C. to about 50° C., such as from about 20° C. to about 30° C. Mixing, such as centrifugal mixing, may be employed to assist the polymerization reaction(s).

In certain methods, effective polymerization conditions include two-stage curing with a first curing stage conducted at a first temperature from about 10° C. to about 50° C. for a first time from about 30 minutes to about 2 hours, such as from about 45 minutes to about 90 minutes; and a second curing stage conducted at a second temperature of about 50° C. to about 100° C., such as from about 75° C. to about 85° C., for a second time from about 2 hours to about 6 hours, such as from about 3 hours to about 5 hours.

The method may further comprise utilizing the polyoxalamide polymer to fabricate a lens, a window, a coating, a film, a film adhesive, a protective material, or a combination thereof. The polyoxalamide polymer may be characterized by a transparency selected from the group consisting of UV transparency, visual transparency, NIR transparency, MWIR transparency, LWIR transparency, and combinations thereof.

The infrared-transparent polymer as disclosed may be present in an MWIR and/or LWIR transparent window, an MWIR and/or LWIR lens, or an MWIR and/or LWIR optical device, for example.

Applications include, but are not limited to, night vision systems and LiDARs that function in the MWIR and LWIR. Tougher and less breakage-prone windows and lenses are useful for highly durable IR vision systems. Infrared windows and lenses are useful for military applications, replacing damage-prone semiconductor or oxide windows. Sheets of the infrared-transparent polymer as disclosed may function as IR-transparent anti-fouling appliques for LWIR LiDARs. In some embodiments, IR-transparent plastic panels may be placed in front of sensors to protect them after being mounted on the outside of vehicles. Some embodiments enable IR-transparent composite panels that utilize an IR-transparent fiber in the composite panel. The IR-transparent fiber allows easy inspection for damage.

EXAMPLES

Materials.

Dibutyl oxalate, 1,5-diamino-2-methylpentane, toluene, xylenes, and paraffin oil are purchased from Sigma Aldrich (St. Louis, Missouri, USA) and used as received. Priamine 1074 is procured from Croda Inc. (Edison, New Jersey, USA) and used as received. Priamine 1074 is (12E,15E)-N-[(21E,24E)-hexatriaconta-21,24-dienyl]hexatriaconta-12,15-dien-1-amine (International Union of Pure and Applied Chemistry, IUPAC name) and its chemical structure is shown in FIG. 3. Hexatran-100 is procured from Ascend Performance Materials (Houston, Texas, USA) and used as received. Hexatran®-100 is 4-(aminomethyl)octane-1,8-diamine (IUPAC name) and its chemical structure is shown in FIG. 3. Dibutyl oxalate is also known as the dibutyl ester of ethanedioic acid, and its chemical structure is shown in FIG. 3. PbSe nanoparticles are obtained from NNCrystal US Corporation (Fayetteville, AR, USA).

In these Examples, PBH-121, DBH-121, and PBD-121 indicate the three components used based on their single-letter abbreviations (P=Priamine 1074, B=dibutyl oxalate, H=Hexatran-100, and D=1,5-diamino-2-methylpentane) and the corresponding mole ratios of the components. For example, PBH-121 refers to a material made from Priamine 1074, dibutyl oxalate, and Hexatran-100 in a 1:2:1 molar ratio, respectively.

Example 1: Nanoparticle-Loaded Polyoxalamide

Pb Se nanoparticles with a 20-nm average diameter and with a 1-nm-thick ZnS shell are delivered with octadecylamine ligands and in n-hexane solvent. To become miscible with a polyoxalamide prepolymer, the nanoparticles are concentrated and then exchanged into xylene as a new solvent. The nanoparticle solution is precipitated with dry ethanol and centrifuged. The supernatant is discarded. The nanoparticles are dissolved in xylene at a concentration of 40 mg/g.

To make a 2 wt % nanoparticle-loaded polyoxalamide, dibutyl oxalate (0.694 g, 2 equivalents), Priamine 1074 (0.916 g, 1 equivalent), and 40 mg/g nanoparticle solution (0.67 g) are added to a 50 mL plastic container. Additional xylene (0.50 g) is added to stabilize the nanoparticle dispersion. The container is sealed and mixed with a FlackTek mixer for 1 minute at 2000 rpm to form the prepolymer. The prepolymer solution is then bubbled with argon for 20 minutes to remove some of the added solvent and placed under inert atmosphere. Hexatran-100 (0.198 g) is added to the prepolymer and the contents are mixed with a FlackTek mixer for 10 seconds at 2000 rpm. The resulting mixture is expeditiously cast onto Mylar to a thickness of 10 mil, allowed to crosslink at ambient temperature (about 25° C.) for 1 hour, and then post-cured at 80° C. for 6 hours to remove condensate products. Free-standing films are obtained after post-curing.

To make the 5 wt % nanoparticle-loaded polyoxalamide, dibutyl oxalate (0.571 g, 2 equivalents), Priamine 1074 (0.754 g, 1 equivalent) and 40 mg/g nanoparticle solution (1.41 g) are added to a 50 mL plastic container. The container is sealed and mixed with a FlackTek mixer for 1 minute at 2000 rpm to form the prepolymer. The prepolymer solution is then bubbled with argon for 20 minutes to remove some of the added solvent and placed under inert atmosphere. Hexatran-100 (0.090 g) is added to the prepolymer and the contents are mixed with a FlackTek mixer for 10 seconds at 2000 rpm. The resulting mixture is expeditiously cast onto Mylar to a thickness of 10 mil, allowed to crosslink at ambient temperature for 1 hour, and then post-cured at 80° C. for 6 hours to remove condensate products. Free-standing films are obtained after post-curing.

To make the 10 wt % nanoparticle-loaded polyoxalamide, dibutyl oxalate (0.315 g, 2 equivalents), Priamine 1074 (0.416 g, 1 equivalent) and 40 mg/g nanoparticle solution (1.64 g) are added to a 50 mL plastic container. The container is sealed and mixed in a FlackTek for 1 minute at 2000 rpm to form the prepolymer. The prepolymer solution is then bubbled with argon for 20 minutes to remove some of the added solvent and placed under inert atmosphere. Hexatran-100 (0.090 g) is added and the contents are mixed in a FlackTek mixer for 10 seconds at 2000 rpm. The resulting mixture is expeditiously cast onto Mylar to a thickness of 10 mil, allowed to crosslink at ambient temperature for 1 hour, and then post-cured at 80° C. for 6 hours to remove condensate products. Free-standing films are obtained after post-curing.

Figure 2:
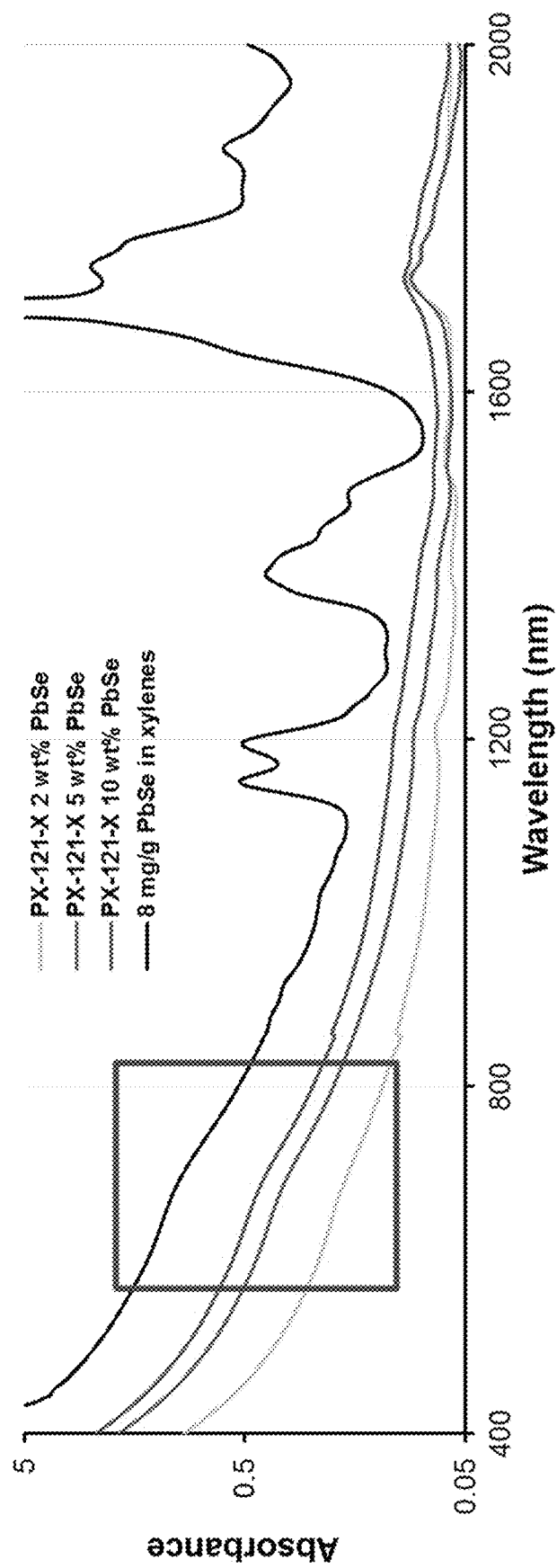
FIG. 2 shows UV/VIS absorption spectroscopy of PbSe nanoparticles in a polyoxalamide matrix, in Example 1.

The samples of polyoxalamide polymer with PbSe nanoparticles are measured with UV/VIS absorption spectroscopy and the data is shown in FIG. 2. The data is compared to a solution of Pb Se nanoparticles that is not incorporated into polyoxalamide (black curve). The red box in FIG. 2 indicates the PbSe exciton peaks. The exciton peak of all samples is observed at about 700 nm. The exciton peak does not shift after incorporation into polyoxalamide, which shows that the PbSe nanoparticles are neither oxidized nor agglomerated. This constant exciton peak positions demonstrated that the nanoparticles are uniformly dispersed in the polyoxalamide matrix. The large peaks in the PbSe-in-xylene control sample are from the xylene solvent.

The index of refraction of the base polyoxalamide (with no PbSe) is 1.50. Based on the index of refraction of PbSe (n=5), and the density of PbSe ($\rho$=8.27 g/cm$^3$), the change in the index of refraction of the polyoxalamide/PbSe composite is calculated as shown in Table 1. The index of refraction is extrapolated to higher nanoparticle loadings (15 wt %, 20 wt %, and 30 wt % PbSe). According to Table 1, there is an increase in index of refraction of 0.25.

TABLE 1

Effect of PbSe Loading in Polyoxalamide
on the Index of Refraction of the Composite.

| PbSe wt % | Refractive Index (n) |
|---|---|
| 0 | 1.50 |
| 10 | 1.57 |
| 15 | 1.61 |
| 20 | 1.65 |
| 30 | 1.75 |

Example 2: Fabrication of PBH-121 Polyoxalamide Polymer

Priamine 1074 (5.00 g, 9.36 mmol, 1 eq), dibutyl oxalate (3.79 g, 18.72 mmol, 2 eq), and toluene (2.00 g) are added to a 100 mL FlackTek (Landrum, South Carolina, USA) container. The container is sealed and mixed in a centrifugal mixer at 2000 rpm for 1 minute. Hexatran-100 (1.08 g, 6.24 mmol, 1 eq) and toluene (1.00 g) are added to a 100 mL FlackTek container. The container is sealed and mixed in a centrifugal mixer at 2000 rpm for 1 minute. The polyoxalamide prepolymer is stored at 5° C. for 10 minutes before prepolymer and curative solution are combined and mixed in a centrifugal mixer at 2000 rpm for 10 seconds. The mixture is cast onto Mylar film using a doctor blade set at 10 mil and allowed to set for 1 hour at room temperature (about 25° C.). The crosslinked film is then heated to 80° C. for 12 hours to remove residual toluene solvent. Films with thicknesses from 2 mil to 10 mil are fabricated.

Example 3: Fabrication of PBH-341 Polyoxalamide Polymer

Priamine 1074 (6.00 g, 11.24 mmol, 3 eq), dibutyl oxalate (3.03 g, 14.98 mmol, 4 eq), and toluene (2.00 g) are added to a 100 mL FlackTek container. The container is sealed and mixed in a centrifugal mixer at 2000 rpm for 1 minute. The prepolymer curative solution is prepared by adding Hexatran-100 (0.87 g, 2.48 mmol, 1 eq) and toluene (1.00 g) to a 100 mL FlackTek container. The container is sealed and mixed in a centrifugal mixer at 2000 rpm for 1 minute. The prepolymer curative is stored at 5° C. for 10 minutes before prepolymer and curative solution are combined and mixed in a centrifugal mixer at 2000 rpm for 10 seconds. The mixture is cast onto Mylar film using a doctor blade set at 10 mil and allowed to set for 1 hour at room temperature (about 25° C.). This thermosetting reaction crosslinks the polymer. The crosslinked film is then heated to 80° C. for 12 hours to remove residual toluene solvent. Films with thicknesses from 2 mil to 10 mil are fabricated.

Example 4: Spray-Coated Polyoxalamide Thermoset

Polyoxalamide prepolymer from Example 2 is diluted with toluene (10.35 g) and poured into a spray cup. The polyoxalamide prepolymer curative solution from Example 2 is diluted with toluene (15.50 g) and poured into a spray cup. Using two airbrushes attached in parallel to allow for spraying of dual streams, the two components are sprayed simultaneously onto a Mylar substrate. The sprayed film is allowed to set for 1 hour at room temperature (about 25° C.). This thermosetting reaction crosslinks the polymer. The crosslinked film is then heated to 80° C. for 12 hours to remove residual toluene solvent. The final film thickness is about 4 mil (about 100 μm).

Example 5: Fourier Transform Infrared Spectroscopy (FT-IR)

FT-IR transmission spectra are obtained for the polyoxalamide polymer of Example 2 using a Nicolet iS50 FT-IR spectrometer from Thermo Fisher Scientific (Waltham, Massachusetts, USA). Spectra are recorded over the 400-8000 cm$^{-1}$ wavenumber range by cumulating 32 scans at 4 cm$^{-1}$ resolution, corrected for baseline.

Example 6: Dynamic Mechanical Analysis (DMA)

Figure 4:
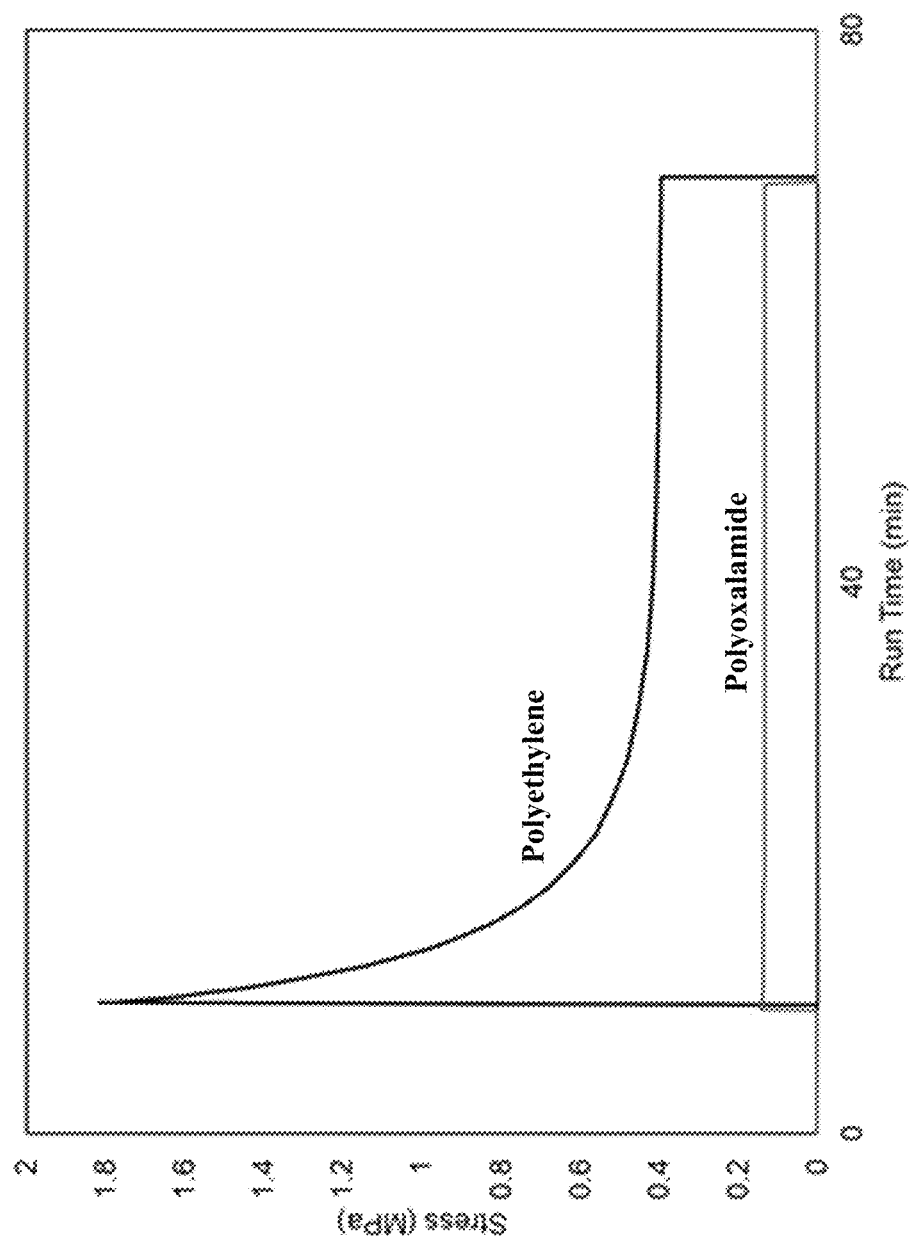
FIG. 4 shows DMA plots illustrating thermomechanical properties of the polyoxalamide polymer of Example 2 (green) in comparison to a commercial polyethylene film (blue).

Dynamic mechanical analysis is carried out in oscillatory tension mode at 1 Hz, 50 μm amplitude, and 3° C./min to reveal the behavior of storage modulus versus temperature from −100° C. to 200° C. FIG. 4 shows DMA stress relaxation curves at 10% strain and 120° C., illustrating thermomechanical properties of the polyoxalamide polymer of Example 2 (green curve) in comparison to a commercial polyethylene film (black curve). The polyoxalamide stress is maintained with little to no relaxation while polyethylene relaxes significantly over the soak time.

Example 7: Tensile Testing

Tensile experiments are performed on an Instron® 5969 testing system from Instron (Norwood, Massachusetts, USA). Dogbone specimens of the polyoxalamide material from Example 2 and from Example 3 are cut for testing. The tensile testing is conducted at 10 mm/min. The results are shown in Table 2 below.

TABLE 2

Tensile Properties of Polyoxalamide Thermoset Films
Compared to a Commercial Polyethylene Film.

| Example | Stress at Break (MPa) | Strain at Break (%) | Modulus (MPa) |
|---|---|---|---|
| 2 | 78 | 187 | 118 |
| 3 | 56 | 235 | 75 |
| Polyethylene | 254 | 433 | 259 |

Example 8: Fabrication of PBH-121 Polyoxalamide Polymer

To fabricate a PBH-121 prepolymer, dibutyl oxalate (2 equivalents, 3.50 g) is added at once to Priamine 1074 (1 equivalent, 4.62 g) in a plastic container and mixed in a FlackTek for 1 minute at 2000 rpm. The mixture is then left to cool off for 5 minutes at room temperature (about 25° C.) while curative is weighed. Hexatran-100 (1 equivalent, 1.00 g) is quickly added to the prepolymer. The mixture is immediately mixed at 2000 rpm for 6 seconds. The contents are quickly cast on a sheet of Mylar on top of a glass plate. This step is completed within 2 minutes to ensure that the film can be cast smoothly before crosslinking occurs. The film is left at room temperature for 1 hour and then placed in an 80° C. oven for at least 6 hours to completely evaporate butanol condensate.

FIG. 3 depicts the overall reaction scheme employed in Example 8.

Example 9: Fabrication of PBD-121 Polyoxalamide Polymer

To fabricate a PBD-121 prepolymer, dibutyl oxalate (2 equivalents, 3.48 g) is quickly added at once to Priamine 1074 (1 equivalent, 4.59 g) in a plastic container and mixed in a FlackTek for 1 minute at 2000 rpm. The mixture is then left to cool off for 5 minutes at room temperature (about 25° C.) while curative is weighed. 1,5-Diamino-2-methylpentane (1 equivalent, 1.00 g) is quickly added to the prepolymer. The mixture is immediately mixed at 2000 rpm for 6 seconds. The contents are quickly cast on a sheet of silanized Mylar on top of a glass plate. This step is completed within 2 minutes to ensure that the film can be cast smoothly before crosslinking occurs. The film is left at room temperature for 1 hour and then placed in an 80° C. oven for at least 6 hours to completely evaporate butanol condensate.

Example 10: Fabrication of DBH-121 Polyoxalamide Polymer

To fabricate a DBH-121 prepolymer, 1,5-diamino-2-methylpentane (1 equivalent, 2.01 g) is quickly added at once to dibutyl oxalate (2 equivalents, 7.00 g) in a plastic container and mixed in a FlackTek for 1 minute at 2000 rpm. The mixture is then left to cool off for 5 minutes at room temperature (about 25° C.) while curative is weighed. Hexatran-100 (1 equivalent, 2.00 g) is quickly added to the prepolymer. The mixture is immediately mixed at 2000 rpm for 6 seconds. The contents are quickly cast on a sheet of Mylar on top of a glass plate. This step is completed within 2 minutes to ensure that the film can be cast smoothly before crosslinking occurs. The film is left at room temperature for 1 hour and then placed in an 80° C. oven for at least 6 hours to completely evaporate butanol condensate.

Figure 5:
FIG. 5 displays a camera image of a 10-mil film of the Example 8 polyoxalamide polymer.
Figure 6:
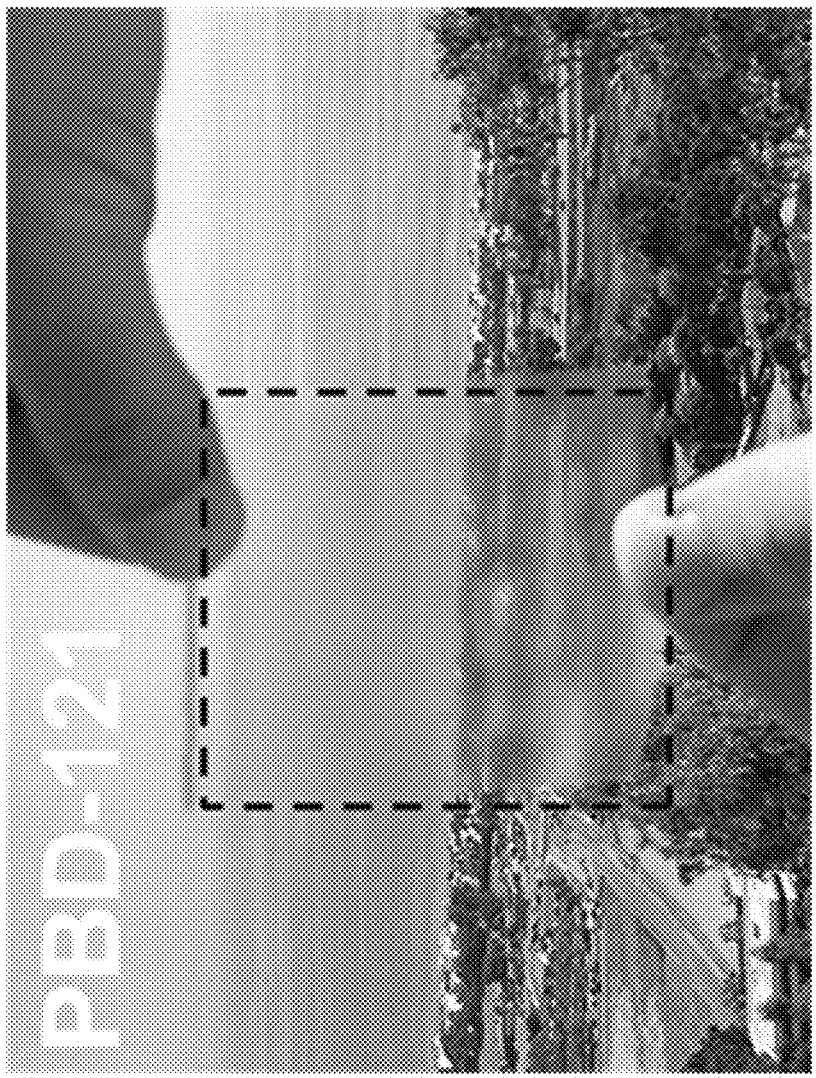
FIG. 6 displays a camera image of a 10-mil film of the Example 9 polyoxalamide polymer.
Figure 7:
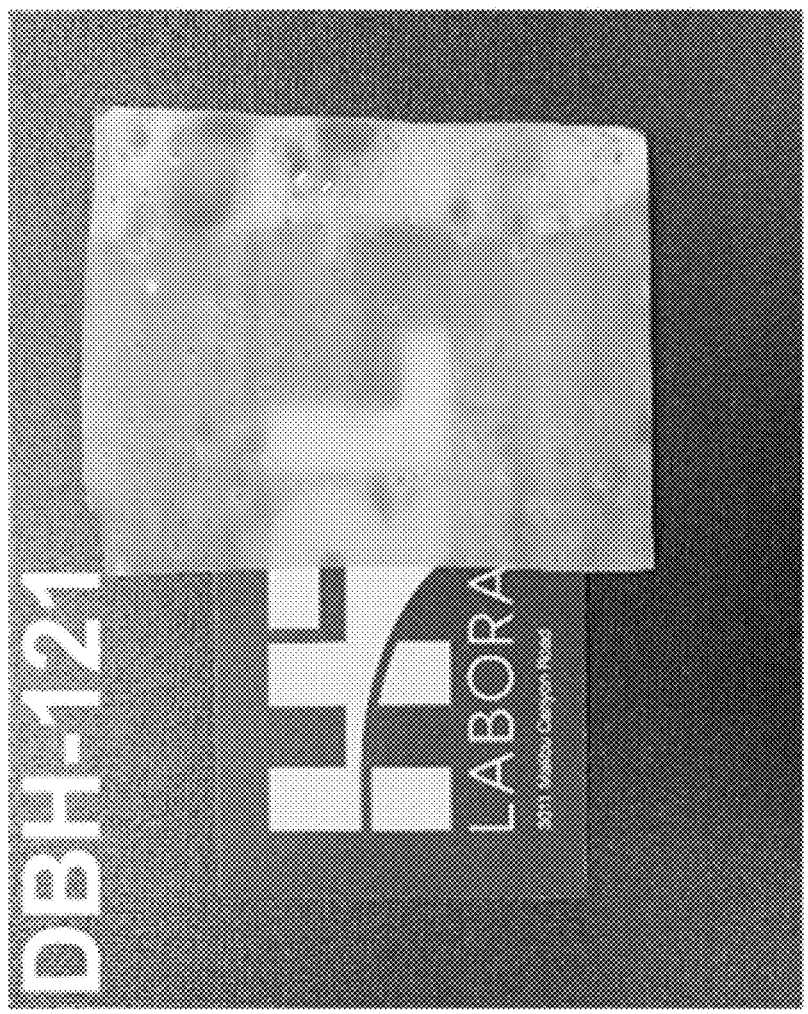
FIG. 7 displays a camera image of a 10-mil film of the Example 10 polyoxalamide polymer.

Example 11: Comparison of PBH-121 Polyoxalamide Polymer, PBD-121 Polyoxalamide Polymer, and DBH-121 Polyoxalamide Polymer FIGS. 5, 6, and 7 show camera images of 10-mil films of Example 8 (PBH-121), Example 9 (PBD-121), and Example 10 (DBH-121), respectively. These color images qualitatively reveal the degree of visual-spectrum transparency through each of the polymer films. As can be observed, the PBH-121 polyoxalamide polymer, when placed over a live scene from Malibu, California, USA, is significantly transparent to ordinary light. By contrast, the PBD-121 polyoxalamide polymer, when placed over the same live scene, generates a blurry camera image, indicating lack of visual transparency. The DBH-121 polyoxalamide polymer, when placed over an ink-bearing HRL Laboratories card, shows significant visual opacity.

Table 3 below summarizes mechanical properties of the polymers of Example 8 (PBH-121), Example 9 (PBD-121), and Example 10 (DBH-121). Polyoxalamide polymer PBH-121 exhibits excellent mechanical properties. Polyoxalamide polymer PBD-121 exhibits a low modulus. Polyoxalamide polymer DBH-121 exhibits a very high modulus, but according to FIG. 7, inferior visual transparency. PBH-121 is a preferred amorphous, branched aliphatic composition because this optimized polyoxalamide polymer simultaneously provides a combination of high visual clarity and good mechanical performance.

TABLE 3

Mechanical Properties of Polyoxalamide Thermoset Films in Examples 8, 9, and 10.

| Example | Elongation (%) | Instantaneous Failure Stress (MPa) | Modulus (MPa) |
|---|---|---|---|
| 8 (PBH-121) | 203 ± 3 | 35.2 ± 1.1 | 120 |
| 9 (PBD-121) | 69 ± 23 | 11.7 ± 1.2 | 5.8 |
| 10 (DBH-121) | 6 ± 2 | 10.1 ± 1.1 | 2200 |

Figure 8:
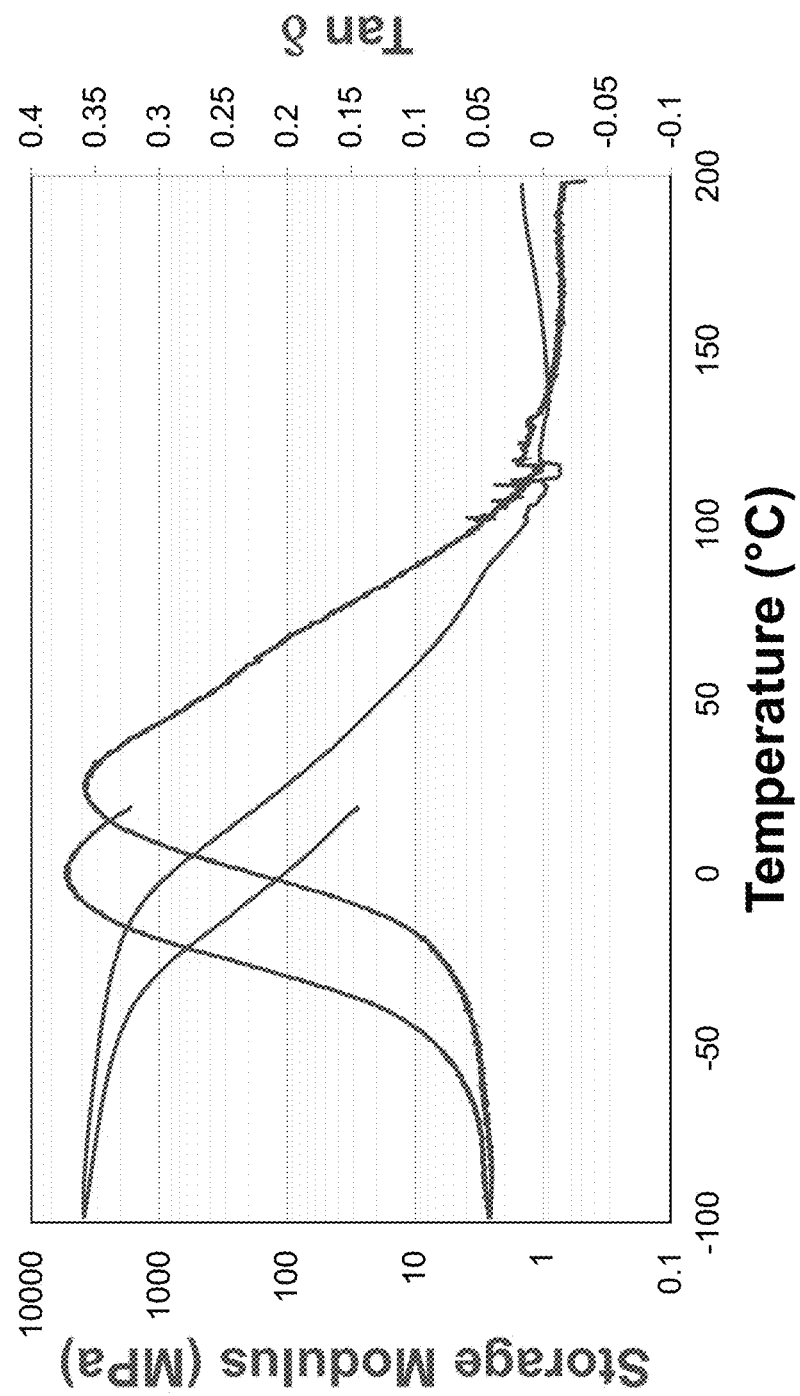
FIG. 8 shows a storage modulus versus temperature sweep of the PBH-121 polyoxalamide thermoset film in Example 12.

Example 12: Mechanical Properties and Broadband Transparency of PBH-121 Polyoxalamide Thermoset Films FIG. 8 is a storage modulus versus temperature sweep of the PBH-121 polyoxalamide thermoset film provided in Example 8. In FIG. 8, storage modulus versus temperature is shown in green, and tan 8 versus temperature is shown in blue. The DMA settings are the same as in Example 6.

Figure 9:
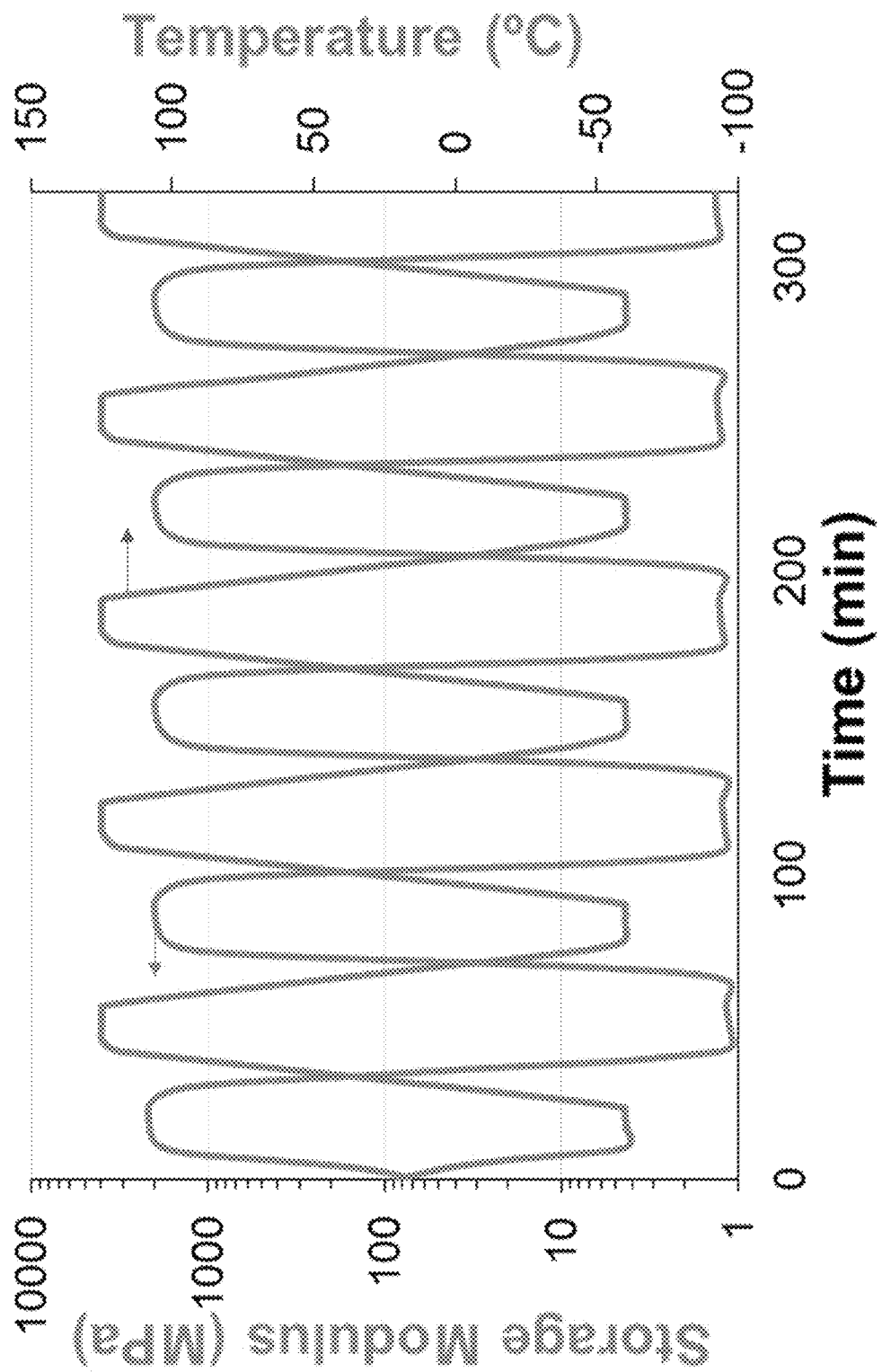
FIG. 9 shows thermal cycling tests of the PBH-121 polyoxalamide thermoset film in Example 12.

FIG. 9 shows thermal cycling tests of the PBH-121 polyoxalamide thermoset film provided in Example 8. In FIG. 9, storage modulus versus time is shown in green, and temperature versus time is shown in blue.

Figure 10:
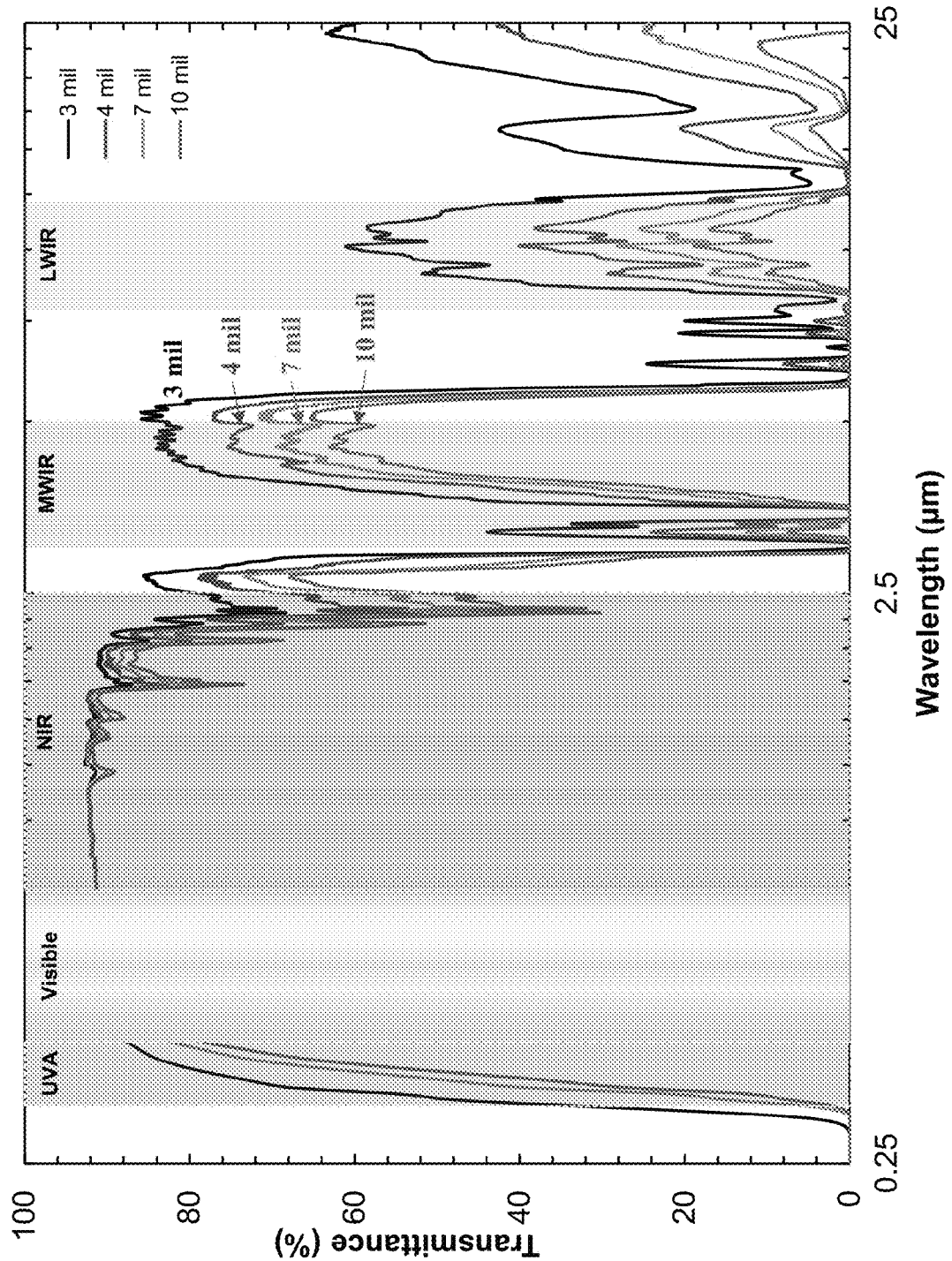
FIG. 10 reveals % transmittance of light versus wavelength, for UV, Vis, and IR bands, for four different film thicknesses (3 mil, 4 mil, 7 mil, and 10 mil), in Example 12.

FIG. 10 is a plot of % transmittance of light versus wavelength, for UV, Vis, and IR bands, for four different film thicknesses (3 mil, 4 mil, 7 mil, and 10 mil). According to FIG. 10, the PBH-121 polyoxalamide polymer exhibits greater than 90% transparency within the UV band, in the Vis band, and within much of the NIR band. The transparencies within the MWIR and LWIR bands vary more with film thickness. For a 4-mil (about 100 μm) film thickness, the peak MWIR transmittance is about 75%, and the peak LWIR transmittance is about 40%.

Example 13: Bonding of PBH-121 Film on a 1-Inch Ge Window

A 1-inch-diameter disc is cut from a PBH-121 sheet (100 microns thick) using a 1-inch circular punch. This disc is then placed on a Mylar sheet coated with a release layer. Using a pipette, 3-4 drops of freshly mixed PBH-121 solution in 50 wt % xylenes is placed on the previously cured PBH-121 disc. A 1-inch germanium (Ge) window is promptly pressed onto the uncured PBH-121 adhesive to bond it to the previously cured film. A glass plate is placed on top of the Ge window to apply pressure while the bonding process proceeds for 1 hour at room temperature (about 25° C.) before transfer to an 80° C. oven for 6 hours. After curing, excess polyoxalamide polymer is cut off the edges of the Ge disc with a razor blade.

Example 14: Accelerated Abrasion of Ge Windows With and Without Protective PBH-121 Film 35-micron glass beads from Comco Inc. (Burbank, California, USA) are loaded in a microbead blaster from Comco Inc. The system pressure is set to 80 psi and a bead blasting nozzle mounted in a configuration that aims the nozzle at the center of the 1-inch Ge window. The 1-inch Ge window is loaded into the clamp and positioned 4.25 inches from the nozzle exit. The particles are fired at the window for a fixed duration.

An unprotected Ge window and a Ge window protected with 100 μm of PBH-121 film are both abraded for 5 seconds, and then another 25 seconds, for a total of 30 seconds exposure each.

Figure 11A:
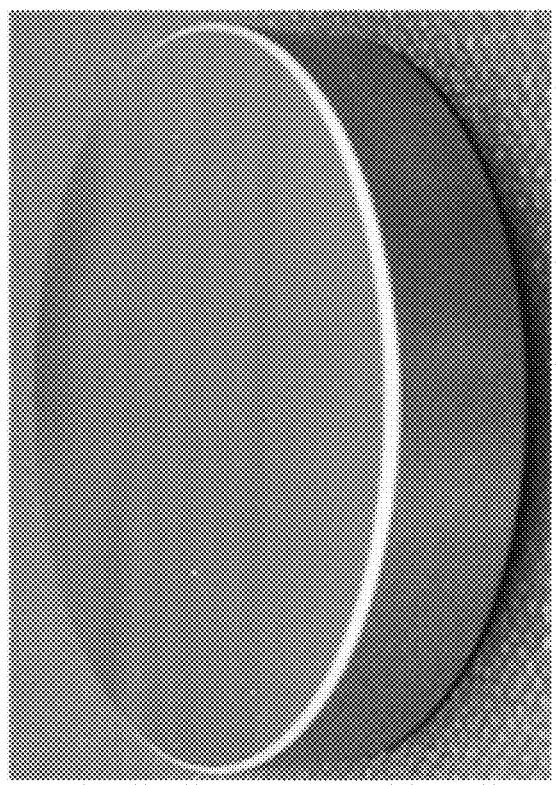
FIG. 11A displays a camera image of an unprotected Ge window before any abrasion (no exposure to glass beads), in Example 14.
Figure 11B:
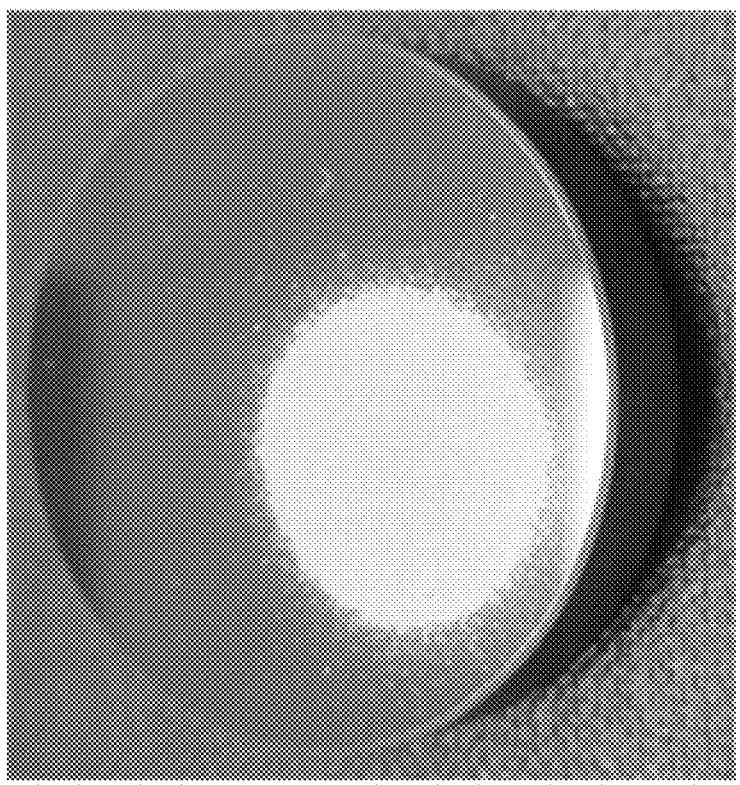
FIG. 11B displays a camera image of an unprotected Ge window after 5 seconds of abrasion with glass beads, in Example 14.
Figure 11C:
FIG. 11C displays a camera image of an unprotected Ge window after 30 seconds of total exposure to glass beads, in Example 14.

FIG. 11A shows a camera image of the unprotected Ge window before any abrasion (no exposure to glass beads). FIG. 11B shows a camera image of the unprotected Ge window after 5 seconds of abrasion with glass beads. FIG. 11C shows a camera image of the unprotected Ge window after 25 additional seconds of abrasion with glass beads (30 seconds of total exposure to glass beads). It is estimated that after 5 seconds of abrasion, there is about 0.1% mass loss of Ge, and that after 30 total seconds of abrasion, there is about 0.9% mass loss of Ge. The significant mass loss and surface roughening are easily observed visually in FIG. 11B and especially FIG. 11C.

Figure 12A:
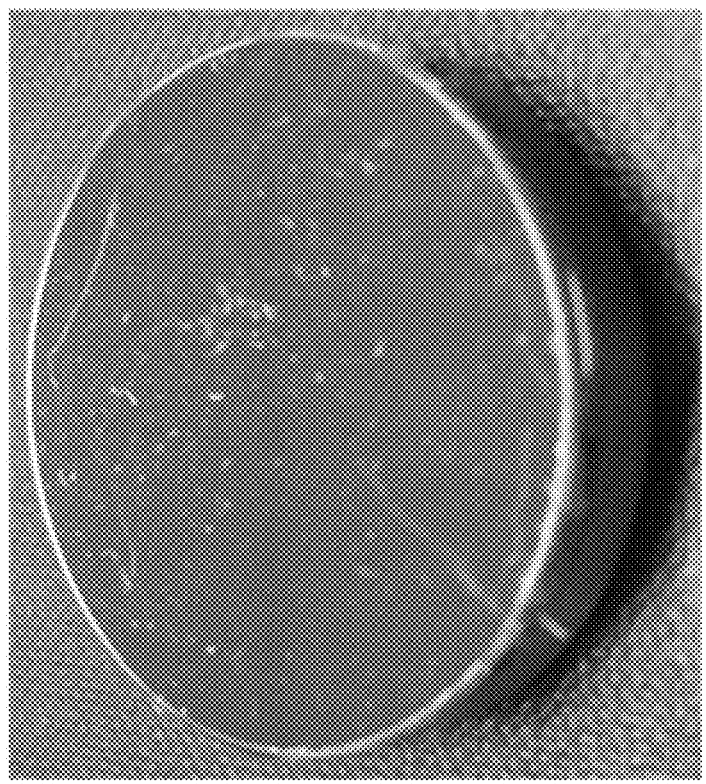
FIG. 12A displays a camera image of a polyoxalamide-protected Ge window before any abrasion (no exposure to glass beads), in Example 14.
Figure 12B:
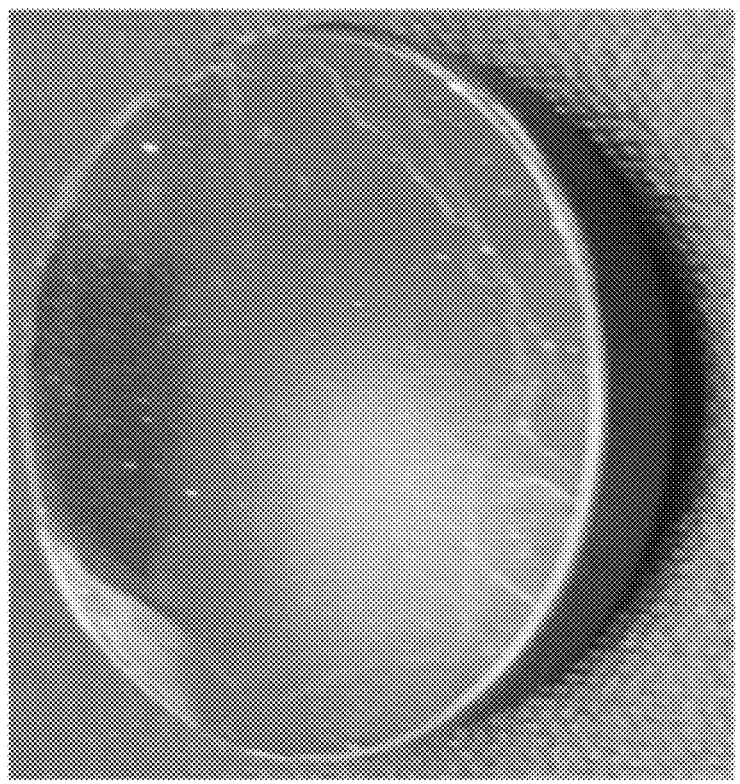
FIG. 12B displays a camera image of a polyoxalamide-protected Ge window after 5 seconds of abrasion with glass beads, in Example 14.
Figure 12C:
FIG. 12C displays a camera image of a polyoxalamide-protected Ge window after 30 seconds of total exposure to glass beads, in Example 14.

FIG. 12A shows a camera image of the polyoxalamide-protected Ge window before any abrasion (no exposure to glass beads). FIG. 12B shows a camera image of the polyoxalamide-protected Ge window after 5 seconds of abrasion with glass beads. FIG. 12C shows a camera image of the polyoxalamide-protected Ge window after 25 additional seconds of abrasion with glass beads (30 seconds of total exposure to glass beads). It is observed that after 5 seconds of abrasion, there is no mass loss of Ge, and that after 30 total seconds of abrasion, there is no mass loss of Ge, from the polyoxalamide-protected Ge window. The surface is only lightly foggy after exposure to glass beads.

Figure 13A:
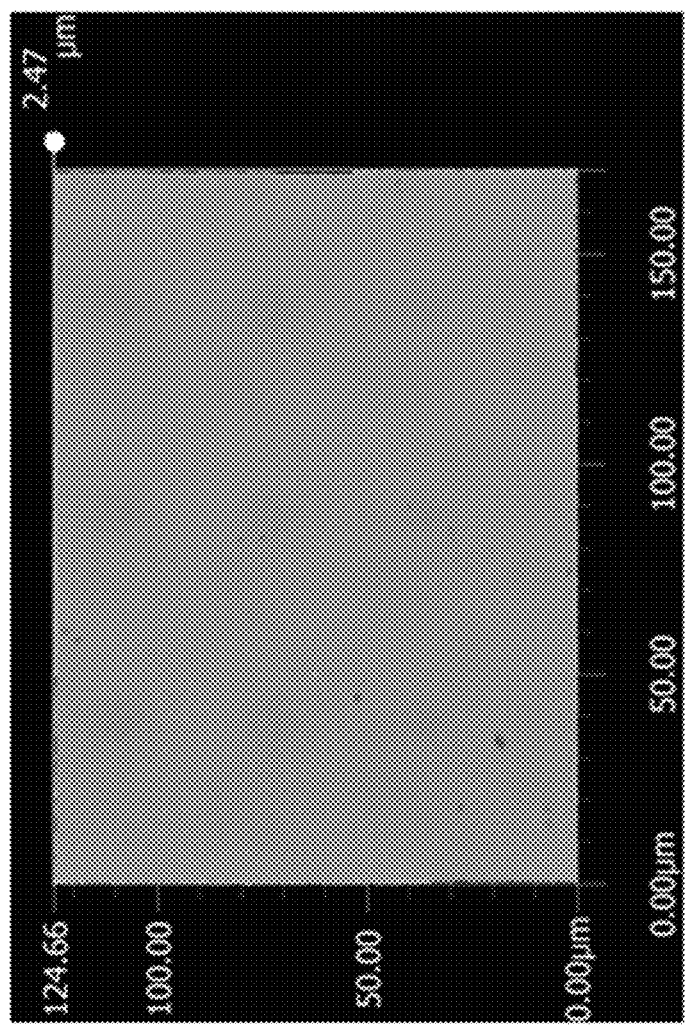
FIG. 13A presents a light-microscope image (photomicrograph) of an unprotected Ge window before any abrasion (no exposure to glass beads), in Example 14.
Figure 13B:
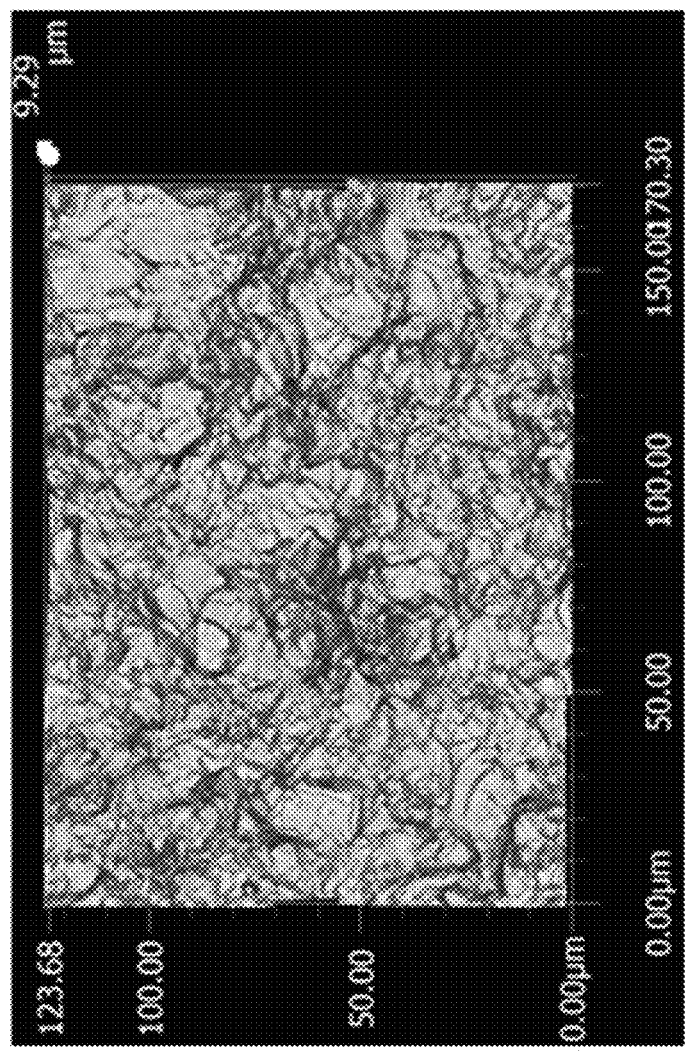
FIG. 13B presents a light-microscope image of an unprotected Ge window after 5 seconds of abrasion with glass beads, in Example 14.
Figure 13C:
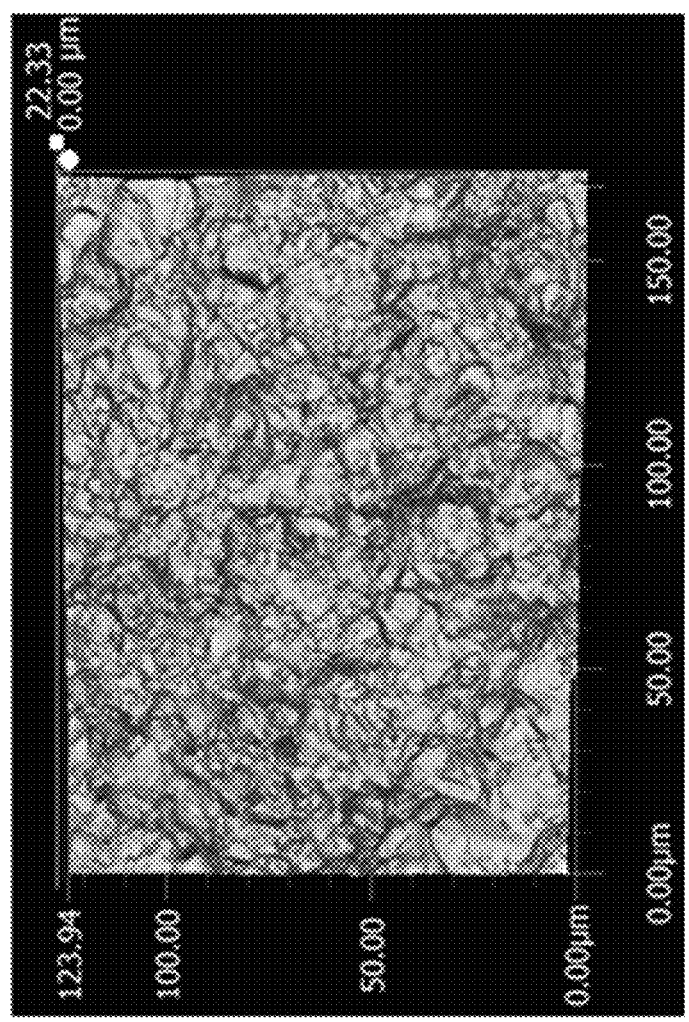
FIG. 13C presents a light-microscope image of an unprotected Ge window after 30 seconds of total exposure to glass beads, in Example 14.

FIG. 13A shows a light-microscope image (photomicrograph) of the unprotected Ge window before any abrasion (no exposure to glass beads). FIG. 13B shows a light-microscope image of the unprotected Ge window after 5 seconds of abrasion with glass beads. FIG. 13C shows a light-microscope image of the unprotected Ge window after 25 additional seconds of abrasion with glass beads (30 seconds of total exposure to glass beads). FIGS. 13B and 13C reveal significant surface roughness caused by the physical impingement of the glass beads onto the Ge surface.

Figure 14A:
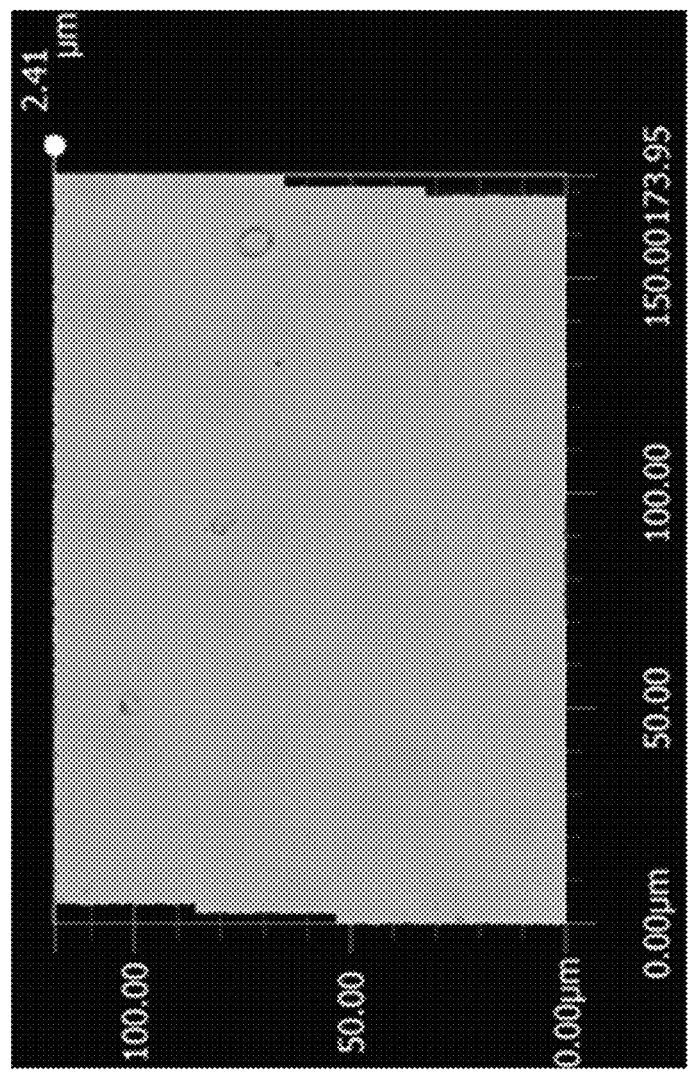
FIG. 14A presents a light-microscope image of a polyoxalamide-protected Ge window before any abrasion (no exposure to glass beads), in Example 14.
Figure 14B:
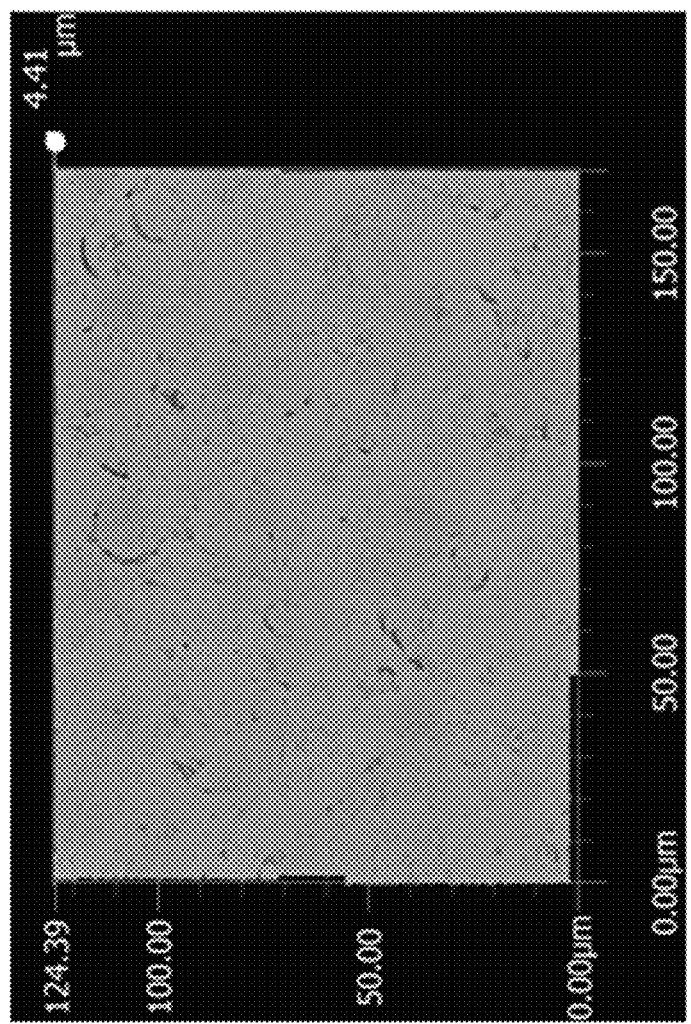
FIG. 14B presents a light-microscope image of a polyoxalamide-protected Ge window after 5 seconds of abrasion with glass beads, in Example 14.
Figure 14C:
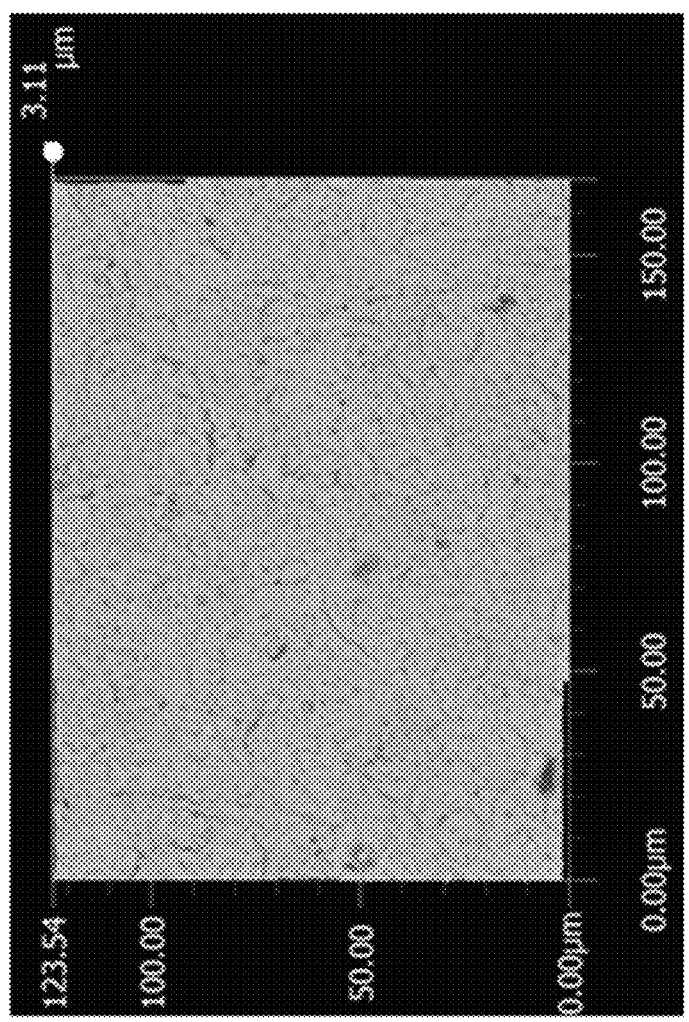
FIG. 14C presents a light-microscope image of a polyoxalamide-protected Ge window after 30 seconds of total exposure to glass beads, in Example 14.

FIG. 14A shows a light-microscope image of the polyoxalamide-protected Ge window before any abrasion (no exposure to glass beads). FIG. 14B shows a light-microscope image of the polyoxalamide-protected Ge window after 5 seconds of abrasion with glass beads. FIG. 14C shows a light-microscope image of the polyoxalamide-protected Ge window after 25 additional seconds of abrasion with glass beads (30 seconds of total exposure to glass beads). Very little surface roughness is caused by the physical impingement of the glass beads onto the polyoxalamide-protected Ge surface.

Figure 15:
FIG. 15 displays a long-wave infrared (LWIR) camera image capturing LWIR transmission through a 1-inch, unprotected Ge window before and after 30 seconds of window abrasion with glass beads, in Example 14.
Figure 15:
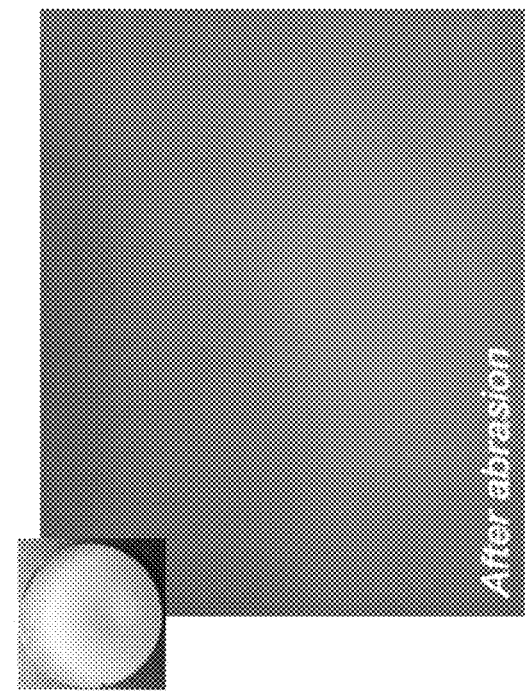

FIG. 15 shows a long-wave infrared (LWIR) camera image capturing LWIR transmission through a 1-inch, unprotected Ge window before and after 30 seconds of window abrasion with glass beads. Following abrasion, there is no clear image capable of being transmitted due to window damage.

Figure 16:
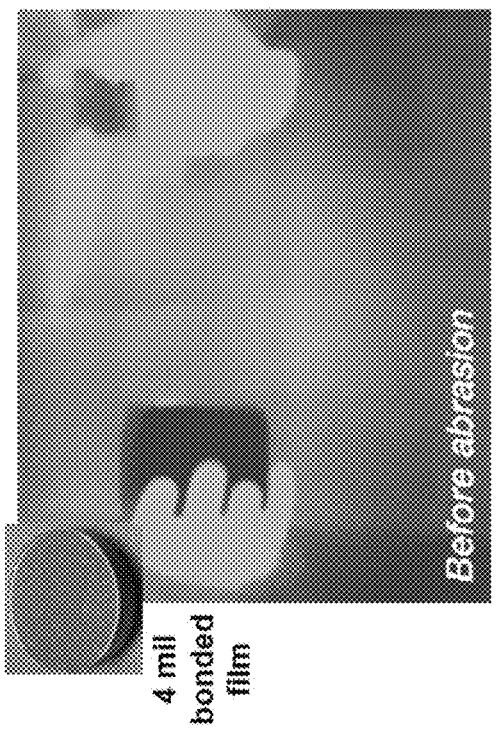
FIG. 16 displays a long-wave infrared (LWIR) camera image capturing LWIR transmission through a 1-inch, polyoxalamide-protected Ge window before and after 30 seconds of window abrasion with glass beads, in Example 14.
Figure 16:
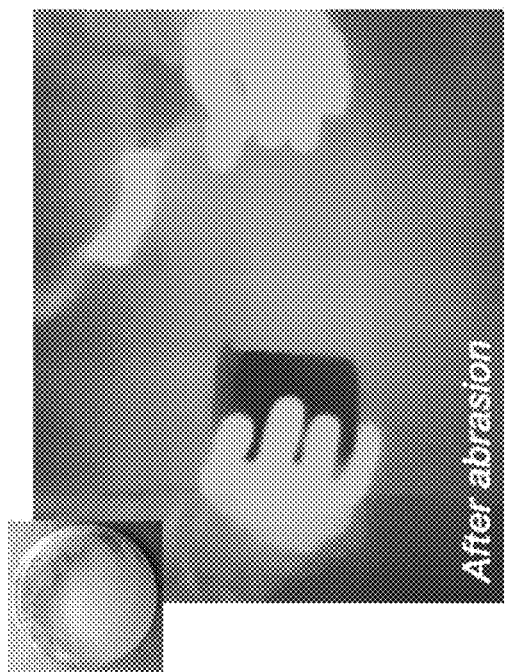

FIG. 16 shows a long-wave infrared (LWIR) camera image capturing LWIR transmission through a 1-inch, polyoxalamide-protected Ge window before and after 30 seconds of window abrasion with glass beads. The Ge window is protected with a bonded film with thickness of 4 mil (about 100 μm). Following abrasion, the LWIR transmission quality is nicely maintained.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. An optic comprising at least 1 wt % of a polyoxalamide polymer, wherein said optic is in the form of an optical lens or an optical window, wherein said optic is characterized by at least 40% average transmission of radiation over a wavenumber band with cumulative wavenumber width of at least 1000 cm$^{-1}$ contained within wavelengths (i) from 0.3 μm to 1.7 μm and (ii) from 3 μm to 5 μm and/or from 8 μm to 12 μm, and wherein said polyoxalamide polymer comprises:

(a) one or more first segments containing at least one repeat unit that includes (i) a branched, aliphatic hydrocarbon species and (ii) first amide groups at internal ends of said repeat unit, wherein said first amide groups are part of oxalamide groups;

(b) one or more polymer end groups containing second amide groups that are each covalently bonded directly to one of said first amide groups, wherein said second amide groups are also part of said oxalamide groups, and wherein said oxalamide groups contain —N—C(=O)—C(=O)—N— sequences; and (c) a reacted form of one or more multifunctional amine chain extenders or crosslinkers with an amine functionality of 3 or greater.

2. The optic of claim 1, wherein said optical lens is a single lens, a compound lens, or an array of lenses.

3. The optic of claim 2, wherein said optical lens is selected from the group consisting of a converging lens, a diverging lens, a collimating lens, and combinations thereof.

4. The optic of claim 1, wherein said optical window is a single window, a compound window, or an array of windows.

5. The optic of claim 4, wherein said optical window is flat, curved on one axis, biaxially curved, curved in three dimensions, or a combination thereof.

6. The optic of claim 1, wherein said cumulative wavenumber width is at least 2000 cm$^{-1}$.

7. The optic of claim 1, wherein said optic further contains filler particles.

8. The optic of claim 7, wherein said filler particles are selected from the group consisting of toughening particles, transparency-modifying particles, refractive index-modifying particles, and combinations thereof.

9. The optic of claim 7, wherein said filler particles are selected from the group consisting of Ge, CaF$_2$, NaCl, KCl, KBr, diamond, Si, CsI, MgO, MgF$_2$, LiF, NaF, BaF$_2$, ZnS, ZnSe, PbS, Pb Se, PbF$_2$, LiYF$_4$, NaYF$_4$, ThBrI, ThBrCl, Si, SiC, Ge, GaAs, AlN, AlON, $Al_2O_3$, polyethylene, polypropylene, and combinations thereof.

10. The optic of claim 7, wherein said filler particles are high-refractive-index nanoparticles that have a higher index of refraction compared to said polyoxalamide polymer, and wherein said high-refractive-index nanoparticles are selected from the group consisting of titanium dioxide, silicon, germanium, zinc oxide, silicon carbide, silicon dioxide, hafnium oxide, zinc selenide, zinc sulfide, sapphire, cesium fluoride, cesium bromide, potassium bromide, potassium iodide, and combinations thereof.

11. The optic of claim 7, wherein said filler particles are in the form of spheres, rods, whiskers, platelets, or a combination thereof.

12. The optic of claim 7, wherein said filler particles have an average dimension selected from about 2 nanometers to about 1 micron.

13. The optic of claim 7, wherein said filler particles have an average volumetric loading from about 1 vol % to about 65 vol % based on volume of said polyoxalamide polymer plus volume of said filler particles.

14. The optic of claim 7, wherein said filler particles contain a ligand to aid in dispersion with said polyoxalamide polymer.

15. The optic of claim 1, wherein said optic further includes, or is disposed in physical contact with, an anti-scratch layer, an anti-abrasion layer, an anti-reflection layer, or a combination thereof.

16. The optic of claim 15, wherein said anti-scratch layer contains diamond, diamond-like carbon, sapphire, silicon, ZnS, SiC, AlON, or a combination thereof.

17. The optic of claim 1, wherein said optic includes a stack of films that collectively provides anti-reflection properties.

18. The optic of claim 1, wherein said optic further includes an anti-rain erosion layer.

19. The optic of claim 18, wherein said anti-rain erosion layer contains an elastomeric material with a storage modulus from about 1 MPa to about 500 MPa, and wherein said elastomeric material has a minimum elongation of 100%.

20. The optic of claim 1, wherein said optic further includes an anti-fouling layer on an exterior surface of said optic, and wherein said anti-fouling layer contains a hydrophobic material.

21. The optic of claim 1, wherein said optic comprises at least 5 wt % of said polyoxalamide polymer.

22. The optic of claim 1, wherein said polyoxalamide polymer (a) is contained in a protective layer coating and/or (b) surrounds an inorganic substrate.

23. The optic of claim 22, wherein said inorganic substrate is selected from the group consisting of silica, quartz, sapphire, $Al_2O_3$, AlON, ZnS, ZnSe, Si, Ge, SiC, GaAs, $CaF_2$, and combinations thereof.

24. The optic of claim 1, wherein said branched, aliphatic hydrocarbon species is derived from a branched monomer selected from the group consisting of (12E,15E)-N-[(21E, 24E)-hexatriaconta-21,24-dienyl]hexatriaconta-12,15-dien-1-amine, 2,2,4-trimethyl hexamethylene diamine, 2,4,4-trimethyl hexamethylene diamine, 2-methyl-L5-pentanediamine, isophorone diamine, chemical analogues thereof, oligomers thereof, and combinations of the foregoing.

25. The optic of claim 1, wherein said N—C(=O)—C(=O)—N— sequences are reaction products derived from starting oxalate species comprising dialkyl oxalates, and wherein said dialkyl oxalates are selected from the group consisting of dimethyl oxalate, diethyl oxalate, dibutyl oxalate, di-tert-butyl oxalate, chemical analogues thereof, and combinations of the foregoing.

26. The optic of claim 1, wherein said multifunctional amine chain extenders or crosslinkers are selected from the group consisting of 4-(aminomethyl)octane-1,8-diamine, 3-(aminomethyl)octane-1,8-diamine, 2-(aminomethyl)octane-1,8-diamine, 1-(aminomethyl)octane-1,8-diamine, tetraethylenetriamine, tetraethylenetetramine, tetraethylenepentamine, N-(hydroxyethyl)diethylenetriamine, chemical analogues thereof, and combinations of the foregoing.

* * * * *